US012801729B2

(12) United States Patent
Chesla

(10) Patent No.: US 12,801,729 B2
(45) Date of Patent: *Nov. 17, 2026

(54) SYSTEMS AND METHODS FOR GENERATING CYBERATTACK PREDICTIONS AND RESPONSES

(71) Applicant: Cybereason Inc., Boston, MA (US)

(72) Inventor: Avi Chesla, Tel Aviv (IL)

(73) Assignee: Cybereason Inc., Boston, MA (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/788,451

(22) Filed: Jul. 30, 2024

(65) Prior Publication Data

US 2025/0036753 A1 Jan. 30, 2025

Related U.S. Application Data

(63) Continuation of application No. 17/454,343, filed on Nov. 10, 2021, now Pat. No. 12,079,330.

(60) Provisional application No. 63/112,029, filed on Nov. 10, 2020.

(51) Int. Cl.

*G06F 21/00* (2013.01)
*G06F 21/55* (2013.01)
*G06F 21/57* (2013.01)
*G06N 7/01* (2023.01)

(52) U.S. Cl.

CPC .......... *G06F 21/552* (2013.01); *G06F 21/577* (2013.01); *G06N 7/01* (2023.01)

(58) Field of Classification Search

CPC .... G06F 21/552; G06F 21/577; G06F 21/554; G06F 21/55; G06N 7/01; H04L 63/1416; H04L 63/1425; H04L 63/1441; H04L 63/1408

See application file for complete search history.

(56) References Cited

U.S. PATENT DOCUMENTS

2005/0138413 A1* 6/2005 Lippmann ............. G06F 21/577 726/4
2016/0205122 A1* 7/2016 Bassett ............... H04L 63/1441 726/23
2016/0359680 A1* 12/2016 Parandehgheibi .. G06F 9/45558
2017/0286690 A1* 10/2017 Chari .................. H04L 63/1433
2018/0198800 A1* 7/2018 Krasser ............... H04L 63/1416
2020/0314141 A1* 10/2020 Vajipayajula ......... H04L 63/145

* cited by examiner

*Primary Examiner* — Yogesh Paliwal
(74) *Attorney, Agent, or Firm* — Banner & Witcoff, Ltd.

(57) ABSTRACT

Systems and methods are provided for making predictions relating to the attack sequence of an attacker or other malicious entity.

45 Claims, 22 Drawing Sheets

SYSTEMS AND METHODS FOR GENERATING CYBERATTACK PREDICTIONS AND RESPONSES

REFERENCE TO RELATED APPLICATIONS

This application is a continuation of U.S. application Ser. No. 17/454,343, filed Nov. 10, 2021, which claims priority to U.S. Provisional Application No. 63/112,029, filed on Nov. 10, 2020, which are herein incorporated by reference in their entireties.

FIELD OF THE INVENTION

Embodiments of the present disclosure relate to cybersecurity and, more particularly, to systems and methods for cyber security prediction and predictive response.

BACKGROUND OF THE DISCLOSURE

There is frequently a pattern to the activity of attackers in a cybersecurity context. Such a pattern is due to habit and past successes that the attacker has experienced. Thus, there is often a correlation between the pattern of activities for the same attacker across multiple attacks in their history.

SUMMARY OF THE DISCLOSURE

According to one aspect of the present disclosure, a method for generating a predictive response to a cyberattack can include detecting information indicative of a cyberattack on an endpoint; configuring the information as an input to a directed graph model, wherein the directed graph model comprises a plurality of nodes, each node representing an attack state; providing the input to the directed graph model; computing, via the directed graph model, a prediction result, the prediction result comprising one or more predicted nodes from the plurality of nodes and one or more associated probabilities; classifying the one or more predicted nodes; and determining, based on the classifying and the prediction result, one or more actions for responding to the cyberattack.

In some embodiments, the method can include, prior to the determining, filtering the one or more nodes based on one or more of probability, distance from the input, classification, and total number of nodes. In some embodiments, filtering the one or more nodes based on probability can include excluding predicted nodes with a probability less than a pre-defined probability threshold. In some embodiments, filtering the one or more nodes based on distance from the input can include excluding predicted nodes with a distance equal to or above a pre-defined threshold. In some embodiments, filtering the one or more nodes based on classification can include excluding predicted nodes that are gap nodes. In some embodiments, the method can include, prior to the determining, verifying that a list of response actions associated with the one or more predicted nodes is unique.

In some embodiments, the information can include a tactic, a technique, a sub-technique, and a software class. In some embodiments, configuring the information as an input to a directed graph model can include identifying a node of the plurality of nodes that matches the information; and demarcating the identified node as evidence. In some embodiments identifying the node that matches the information can include calculating a distance; and determining that the distance is within a predefined range. In some embodiments, the distance can be either a Hamming distance or an Earth movers distance.

In some embodiments, the prediction result further can include a list of response actions. In some embodiments, the list of response actions can include at least one of isolating a host, resetting a password, disabling a user account, blocking a hash, searching emails, blocking a sender, blocking a URL, deleting an email, blocking network traffic, or a kill process. In some embodiments, classifying the one or more predicted nodes can include determining whether each node is a future prediction, a past prediction, or a gap prediction. In some embodiments, the method can include using the prediction result to re-train or update the directed graph model.

In some embodiments, determining, based on the classifying and the prediction results, one or more actions for responding to the cyberattack can include identifying a parent node that is defined as a cause of the prediction result; and setting the one or more actions based on the parent node. In some embodiments, determining, based on the classifying and the prediction result, one or more actions for responding to the cyberattack can include identifying a plurality of parent nodes of the prediction result; and setting the one or more actions based on risk levels of the plurality of parent nodes. In some embodiments, determining, based on the classifying and the prediction result, one or more actions for responding to the cyberattack can include identifying a plurality of parent nodes of the prediction result, wherein each of the plurality of parent nodes comprise equal risk levels; and setting the one or more actions based on a union of actions from the plurality of parent nodes.

In some embodiments, determining, based on the classifying and the prediction result, one or more actions for responding to the cyberattack can include identifying a plurality of parent nodes of the prediction result; and setting the one or more actions based on a level of specificity of a parent node. In some embodiments, determining, based on the classifying and the prediction result, one or more actions for responding to the cyberattack can include identifying a plurality of parent nodes of the prediction result; and setting the one or more actions based on probabilities of the plurality of parent nodes. In some embodiments, determining, based on the classifying and the prediction result, one or more actions for responding to the cyberattack can include identifying a plurality of parent nodes of the prediction result, wherein each of the plurality of parent nodes comprise equal probability levels; and setting the one or more actions based on a union of actions from the plurality of parent nodes. In some embodiments, configuring the information as an input to a directed graph model can include defining at least one evidence node.

According to another aspect of the present disclosure, a method for generating a predictive response to a cyberattack can include receiving information indicative of a cyberattack on an endpoint from a third-party service; configuring the information as an input to a directed graph model, wherein the directed graph model comprises a plurality of nodes, each node representing an attack state; providing the input to the directed graph model; computing, via the directed graph model, a prediction result, the prediction result comprising one or more predicted nodes from the plurality of nodes and one or more associated probabilities; classifying the one or more predicted nodes; and determining, based on the classifying and the prediction result, one or more actions for responding to the cyberattack.

In some embodiments, the method can include, prior to the determining, filtering the one or more nodes based on one or more of probability, distance from the input, classification, and total number of nodes. In some embodiments, filtering the one or more nodes based on probability can include excluding predicted nodes with a probability less than a pre-defined probability threshold. In some embodiments, filtering the one or more nodes based on distance from the input can include excluding predicted nodes with a distance equal to or above a pre-defined threshold. In some embodiments, filtering the one or more nodes based on classification can include excluding predicted nodes that are gap nodes.

In some embodiments, the method can include, prior to the determining, verifying that a list of response actions associated with the one or more predicted nodes is unique. In some embodiments, the information can include a tactic, a technique, a sub-technique, and a software class. In some embodiments, configuring the information as an input to a directed graph model can include identifying a node of the plurality of nodes that matches the information; and demarcating the identified node as evidence. In some embodiments, identifying the node that matches the information can include calculating a distance; and determining that the distance is within a predefined range. In some embodiments, the distance can be either a Hamming distance or an Earth movers distance.

In some embodiments, the prediction result can further include a list of response actions. In some embodiments, the list of response actions can include at least one of isolating a host, resetting a password, disabling a user account, blocking a hash, searching emails, blocking a sender, blocking a URL, deleting an email, blocking network traffic, or a kill process. In some embodiments, classifying the one or more predicted nodes can include determining whether each node is a future prediction, a past prediction, or a gap prediction. In some embodiments, determining, based on the classifying and the prediction result, one or more actions for responding to the cyberattack can include identifying a parent node that is defined as a cause of the prediction result; and setting the one or more actions based on the parent node.

In some embodiments, determining, based on the classifying and the prediction result, one or more actions for responding to the cyberattack can include identifying a plurality of parent nodes of the prediction result; and setting the one or more actions based on risk levels of the plurality of parent nodes. In some embodiments, determining, based on the classifying and the prediction result, one or more actions for responding to the cyberattack can include identifying a plurality of parent nodes of the prediction result, wherein each of the plurality of parent nodes comprise equal risk levels; and setting the one or more actions based on a union of actions from the plurality of parent nodes. In some embodiments, determining, based on the classifying and the prediction result, one or more actions for responding to the cyberattack can include identifying a plurality of parent nodes of the prediction result; and setting the one or more actions based on a level of specificity of a parent node.

In some embodiments, determining, based on the classifying and the prediction result, one or more actions for responding to the cyberattack can include identifying a plurality of parent nodes of the prediction result; and setting the one or more actions based on probabilities of the plurality of parent nodes. In some embodiments, determining, based on the classifying and the prediction result, one or more actions for responding to the cyberattack can include identifying a plurality of parent nodes of the prediction result, wherein each of the plurality of parent nodes comprise equal probability levels; and setting the one or more actions based on a union of actions from the plurality of parent nodes. In some embodiments, configuring the information as an input to a directed graph model can include defining at least one evidence node.

DESCRIPTION

Figure 1:
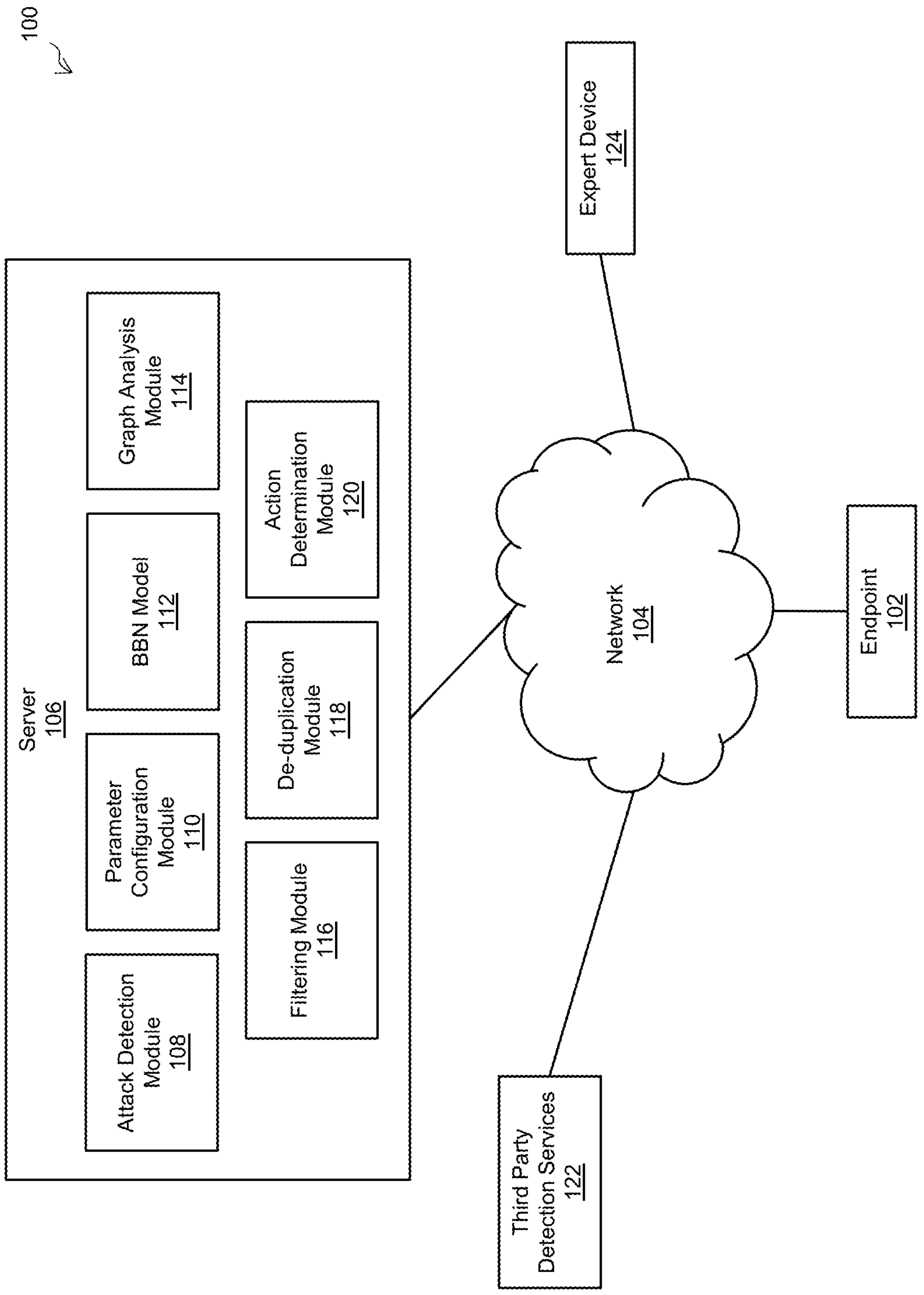
FIG. 1 is a block diagram of an example system for cyber security prediction and predictive response, according to some embodiments of the present disclosure.

The following detailed description is merely exemplary in nature and is not intended to limit the invention or the applications of its use.

Embodiments of the present disclosure relate to systems and methods for making predictions relating to the attack sequence of an attacker or other malicious entity, such as the next step that the attacker will take or previous steps that were taken but went undetected. The disclosed embodiments allows for the discovery of previously hidden activities of an attacker. Furthermore, the disclosed embodiments allow for the discovery of associations of such predicted steps with tangible cybersecurity actions (i.e., remediation actions). The disclosed embodiments use a Bayesian Belief Network (BBN) model combined with expert rules, as well as various other methods and algorithms. Additionally, or alternatively, a Markov model may be used.

The solutions described herein can provide various operational benefits for a Security Operation Center (SOC), a managed security service provider (MSSP), and Managed Detection and Response (MDR) services. In addition, the disclosed solutions can be used by the organizations under attack. The various operational benefits can include a reduction of the mid time to investigate (MTTI), a reduction of the mid time to response (MTTR), and the generation of preventative operations (i.e., predicting an attacker's next step and generating/recommend preventative response actions).

Embodiments of the present disclosure can operate by treating a cyberattack as a graph and/or network. Each node of the graph can correspond to an attack state. Examples of attack states can include, but are not limited to, infiltration, privilege escalation, moving between systems, exfiltration, and others. These states are linked. For example, infiltration will generally proceed exfiltration of stolen data. The order of these activities might depend on the attacker and might be probabilistic. For example, an attacker might proceed from state A to state B1 with probability P1 and to state B2 with probability P2.

The predictive capabilities described herein can utilize various methodologies and concepts. First, the system recognizes a current attack state based on one of its detection services or based on an integration with a third party detection system. These third party systems can include various commercially available systems such as Next-Generation Antivirus (NGAV), Endpoint Detection and Response (EDR), Intrusion Detection and Prevention systems (IDS/IPS), Cloud Work Load Protections (CWPP), Email security systems and Data Leak Protection Systems (DLP), User Entity Behavioral Analytics (UEBA), Identity and Access Management Systems (IAM), Workspace Systems (0365, Google Workspace®), system interrupts, or any other system. Second, a state is defined as a node in an influence diagram. Third, a Bayes influence model represents the probability of moving from one attack state into another, including future and historical steps. In some embodiments, the influence model can be at least partially defined a-priori by one or more security experts. In some embodiments, the model can be discovered by historical attack patterns of the same attacker. For instance, an attacker can be identified by a model or a component that they use, by the language of their keyboard, by their typing patterns/speed, by their IP address, etc. The set of attacks by a given attacker can then be used to define a transition probability within the graph. An example of such a graph is described in relation to FIGS. 3A-3D.

FIG. 1 is a block diagram of an example system 100 for cyber security prediction and predictive response, according to some embodiments of the present disclosure. The system 100 can include an endpoint 102 and a server 106, which are communicably coupled via a network 104. In addition, while one endpoint 102 is shown in system 100, system 100 is not limited to a single endpoint. In particular, the present disclosure may refer to an "endpoint 102" generally or "endpoints 102" collectively. In fact, any number of endpoints can be used within the system 100. Furthermore, system 100 includes an expert device 124 (generally referred to herein as a "expert device 124" or collectively referred to herein as "expert devices 124") that is also communicably coupled to the endpoints 102 and the server 106 via the network 104. Additionally, system 100 can include one or more third party detection services 122 (described above). The one or more third party detection services 122 can connect, interface, monitor, etc., the endpoints 102 and the server 106. For example, the third party detection services 122 can include Next-Generation Antivirus (NGAV), Endpoint Detection and Response (EDR), Intrusion Detection and Prevention systems (IDS/IPS), Cloud Work Load Protections (CWPP), Email security systems and Data Leak Protection Systems (DLP), User Entity Behavioral Analytics (UEBA), Identity and Access Management Systems (IAM), Workspace Systems (0365, Google Workspace®), system interrupts, or any other system.

An endpoint 102 and/or an expert device 124 can include one or more computing devices capable of receiving user input, transmitting and/or receiving data via the network 104, and or communicating with the server 106. In some embodiments, an endpoint 102 and/or an expert device 124 can be representative of a computer system, such as a desktop or laptop computer. Alternatively, an endpoint 102 and/or an expert device 124 can be a device having computer functionality, such as a personal digital assistant (PDA), a mobile telephone, a smartphone, or other suitable device. In some embodiments, an endpoint 102 and/or an expert device 124 can be the same as or similar to the device 1900 described below with respect to FIG. 19. In some embodiments, the system 100 can include any number of endpoints 102 and/or expert devices 124.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

Server device 106 may include any combination of one or more of web servers, mainframe computers, general-purpose computers, personal computers, or other types of computing devices. Server device 106 may represent distributed servers that are remotely located and communicate over a communications network, or over a dedicated network such as a local area network (LAN). Server device 106 may also include one or more back-end servers for carrying out one or more aspects of the present disclosure. In some embodiments, server device 106 may be the same as or similar to server device 1800 described below in the context of FIG. 18. In some embodiments, server 106 can include a primary server and multiple nested secondary servers for additional deployments of server 106. This can enable greater scalability and deployability, as well as the ability to deploy asset-based severity scoring systems at a specific premises if requested by a user.

As shown in FIG. 1, server 106 can include an attack detection module 108, a parameter configuration module 110, a BBN model 112, a graph analysis module 114, a filtering module 116, a de-duplication module 118, and an action determination module 120. The attack detection module 108 is configured to detect attack information associated with an entity (e.g., IP, host, user account, email account, domain, cloud instance, URL, etc.), which can be associated with an endpoint 102. The attack detection module 108 receives a list of the detected techniques, sub-techniques, tactics, and software class. In some embodiments, the attack detection module 108 can also receive attack information from one or more of the third party detection services 122.

The parameter configuration module 110 is configured to receive the attack information from the attack detection module 108 and set/configure query parameters for inputting to the BBN model 112. The BBN model 112 generates prediction results based on the attack information and the configured parameters. Various reference sets describing historical attacks can be used to set up the BBN model 112. In some embodiments, attackers can be grouped based on their characteristics, which can then be used to define patterns of activity for that group. For example, attackers can be grouped if they use the same tools (e.g., script kiddies), are from the same country, or are from the same Advanced Persistent Threat (APT) group. Additionally, attackers can be grouped using various clustering techniques. Once reference sets are defined, the sets can then be sued to predict activity both in the past and future.

The BBN model 112 includes various nodes; the number of nodes can be on the scale of hundreds. Each node (i.e., each child node) is assigned a conditional probability table (CPT) of occurrence given an adjacent current observed mode (herein referred to as "evidence"). A parent node is any node that has at least one child node. A node can be a child of more than one parent and parents can have multiple children. Each node is described by a combination of one or more of the following parameters: (1) CPT—the conditional probability of occurrence given occurrence of a parent node; (2) software—malicious software class, which represents the software's possible malicious intent such as ransomware, adware, unwanted software, DDoS Bot, Spammer, Password stealer, memory scraper, network scanner, vulnerability scanner, keylogger, etc.; (3) sub-technique—an attack sub-technique, which is defined by the MITRE ATT&CK model (herein referred to as MITRE); (4) technique—attack technique (MITRE); (5) tactic—attack tactic (MITRE); (6) role—the role of the node in the attack (victim or performer); (7) response table—a table which includes an ordered list of potential response actions, which can include preventative and/or informative steps; (8) vector—attack vector (e.g., email, network, USB, etc.); (9) risk—risk factors that reflect the risk associated with the node's attack behavior.

The possible connections between the nodes are presented by a unidirectional arrow and each connection is defined as an edge. In cases where a transition is possible in more than one direction, each direction will be represented by a different edge. Benefits of the BBN model 112 include various potential observations: (1) insight into future attack steps—allows for the prediction of next attack states (i.e., child nodes) given the current attack state evidence (i.e., parent nodes); (2) provides contextual response actions that will prevent the next attack states; (3) historical investigations (i.e., root cause)—allows for the prediction of previous attack states given observable evidence nodes; (4) visualization of the most probable path between a parent node to its child nodes and vice versa (these probabilities can be modified by analysts who assign priors to some intermediate nodes); (5) research model definitions—adding/removing nodes and edges, applicable response actions, etc.; (6) experts can assign probabilities to each transition; (7) allows probability inputs from experts/research and via learning algorithms, such as an adaptive influence diagram. Additional details with respect to the BBN model 112 are discussed in relation to FIGS. 4-12.

Figure 3:
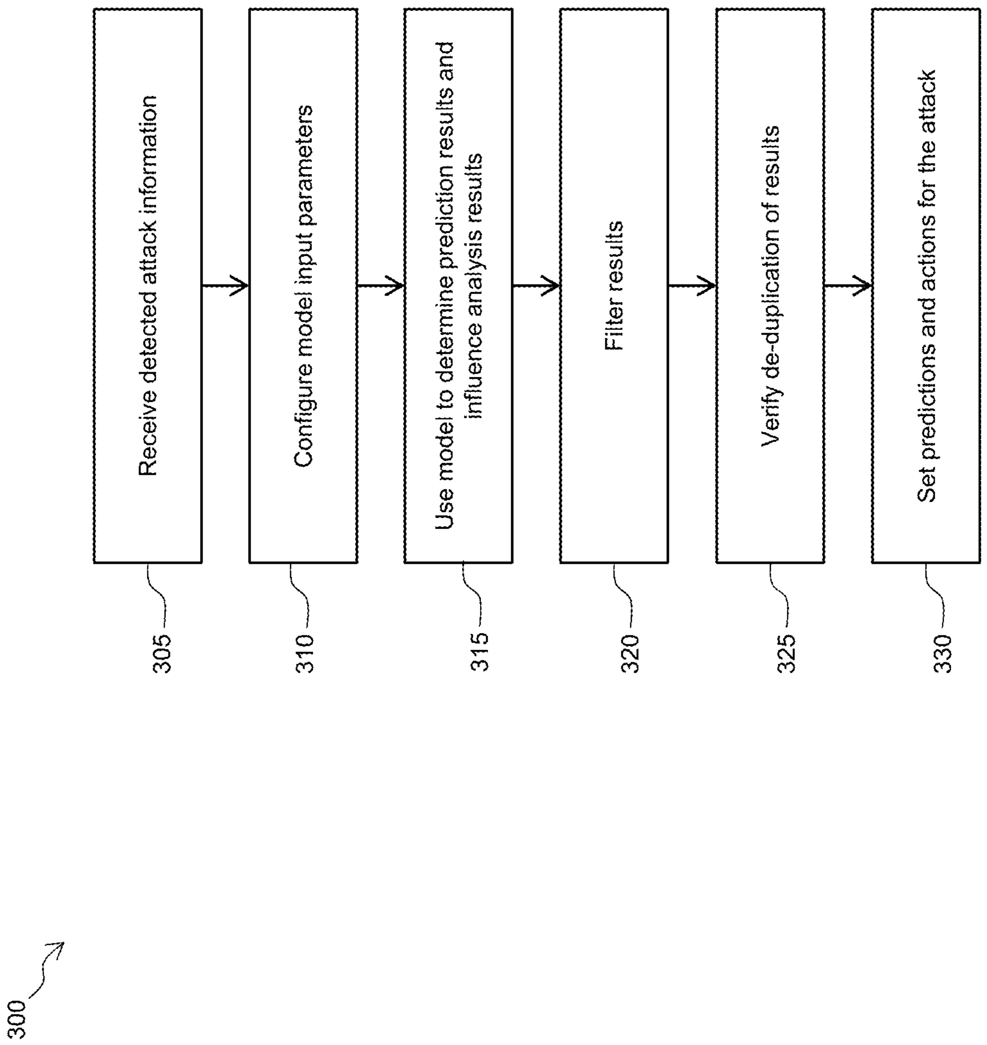
FIG. 3 is an example process for generating a predictive response that can be performed within the system of FIG. 1, according to some embodiments of the present disclosure.

The graph analysis module 114 can provide various predictions based on the BBN model 112's output (additional details discussed in relation to FIG. 3). The filtering module 116 is configured to filter out child nodes from the results of the BBN model 112's analysis. For example, the filtering module 116 can utilize one or more of probability, distance, and count thresholds to filter out nodes. The de-duplication module 118 is configured to obtain potential response actions for the attack and verify that such actions and associated indicators were not already suggested by the system for the same entity. The action determination module 120 is configured to set predictions (i.e., child nodes) and their associated actions (see FIGS. 13-14).

Figure 2A:
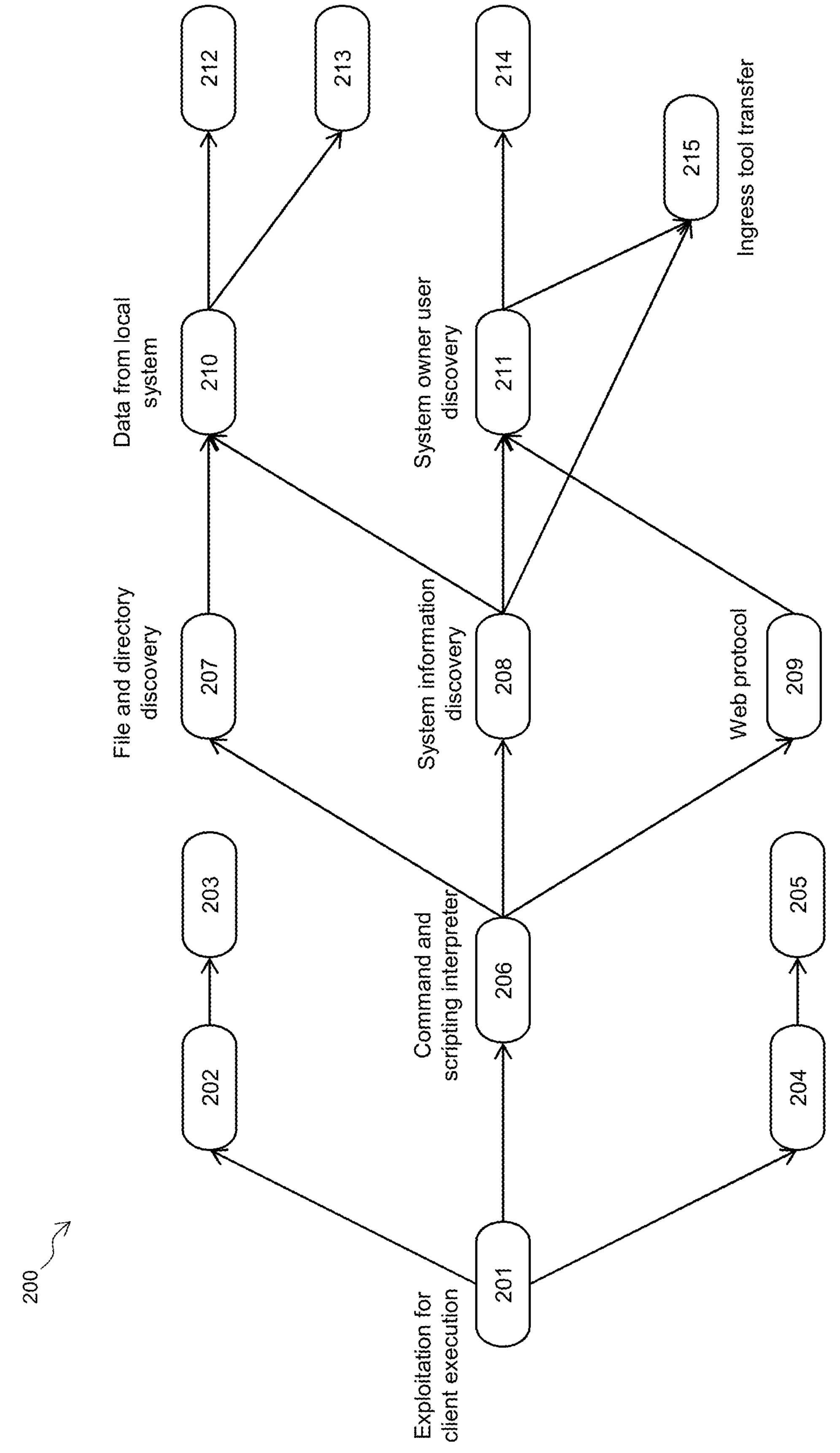
FIGS. 2A-2D show an example attack sequence.

FIGS. 2A-2D show an example attack sequence. In particular, FIG. 2A represents various potential attack sequences in the form of MITRE attack terminology. One of the attack sequences included here describes the 2020 Carbanak's attack campaign. At 201, the diagram 200 begins with an exploitation of a client system, application, or other endpoint. The exploitation is followed by a command and scripting interpreter state at 206, which represents a step that attackers may use to execute commands and scripts. This step provides a way for the attack to interact with the computer system. Then, there are various states following the command scripting interpreter stage 206 that aim to discover information about the target computer system such as file and directory discovery at 207, system information discovery at 208, or web protocol at 209 used for communication, such as http. From here, the attack may transition into obtaining data from the local system at 210, system owner user discovery at 211, and eventually an ingress tool transfer state at 215. An ingress tool transfer state describes a method in which the attacker may transfer dedicated/targeted tools or other files from an external system into a compromised environment.

Figure 2B:
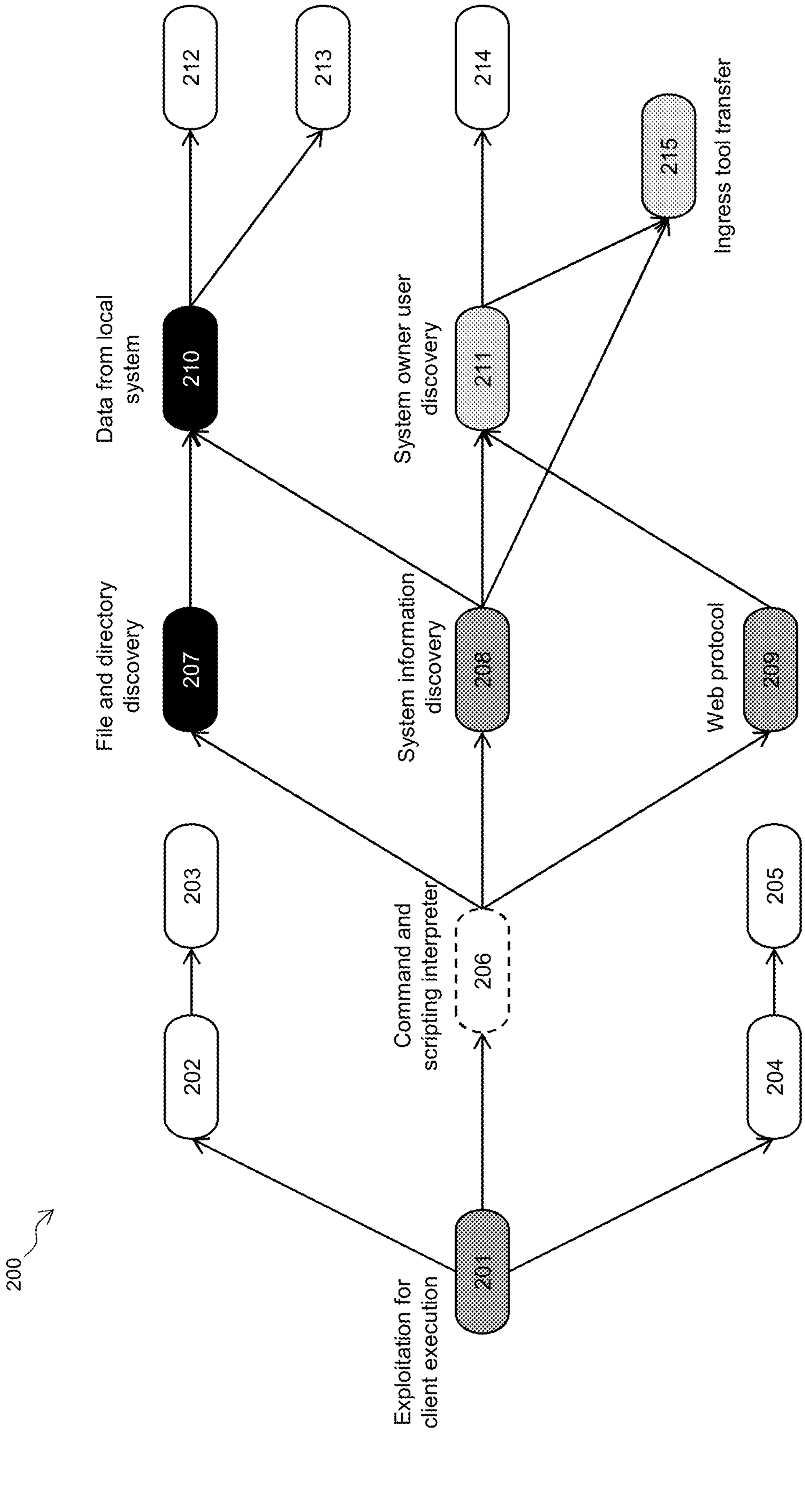

FIG. 2B shows an actual set of attack evidence that typifies a portion of the Carbanak's attacks campaign pattern. Each revealed/detected evidence (indicated by a dashed bubble) elevates the potential next state of the attack based on their probabilities. In FIG. 2B, the detected evidence is the command scripting interpreter stage 206. Based on detecting this (i.e., determining that this stage occurred with 100% certainty), the other stages described above thus may occur with various probabilities. The high probabilities are black, the medium probabilities are dark gray, and the low probabilities are light gray. For example, given the detection of a command and scripting interpreter at 206, there is a high probability that the next stages in the attack will include file and directory discovery at 207 (P=0.7) or data from the local system at 210 (P=0.7). There is a medium probability that, given the detection of a command and scripting interpreter at 206, a previous stage in the attack was an exploitation for client execution at 201. There is also a medium probability that the next stages in the attack will include system information discovery at 208 (P=0.67) or a web protocol stage at 209 (P=0.63). Finally, there is a low probability that, given the detection of a command and scripting interpreter at 206, the next stages in the attack will include system owner user discovery at 211 (P=0.55) or an ingress tool transfer at 215 (P=0.6).

Figure 2C:
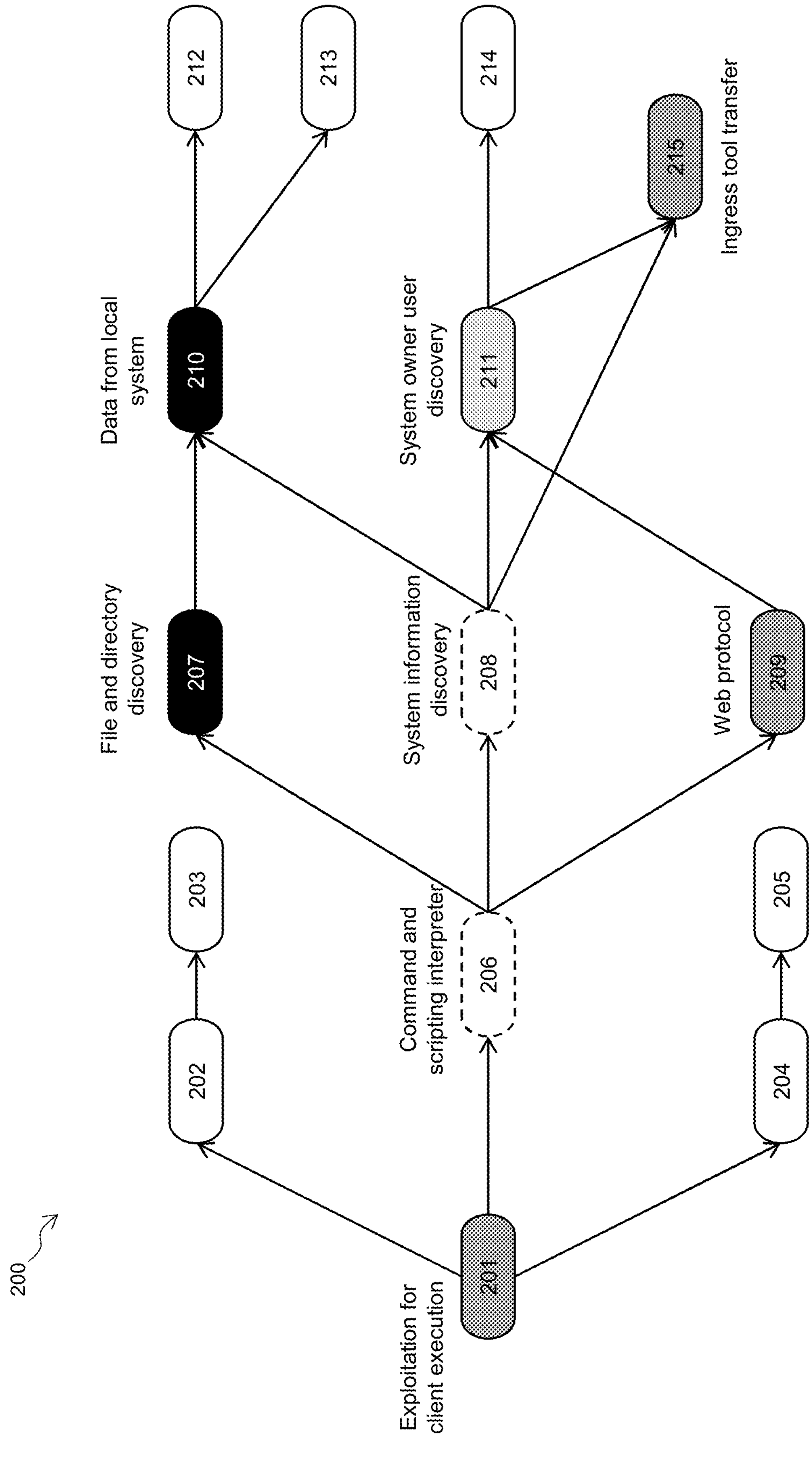

FIG. 2C shows a possible subsequent stage of the attack campaign. In FIG. 2C, the detected evidence is the command scripting interpreter 206 and the system information discovery stage 208. Based on detecting these two pieces of evidence (i.e., determining that these stages occurred with a baseline probability), the other stages thus may occur with various probabilities, which may be different than their respective probabilities in FIG. 2B. Given the detection of the command and scripting interpreter 206 and the system information discovery 208, there is a high probability that the next stages in the attack will include file and directory discovery at 207 (P=0.7) or data from the local system at 210 (P=0.73). There is a medium probability that, given the detection of a command and scripting interpreter at 206, a previous stage in the attack was an exploitation for client execution at 201. There is also a medium probability that the next stages in the attack will include a web protocol stage at 209 (P=0.64) or an ingress tool transfer at 215 (P=0.65). Finally, there is a low probability that the next stage in the attack will include system owner user discovery (P=0.57).

Figure 2D:
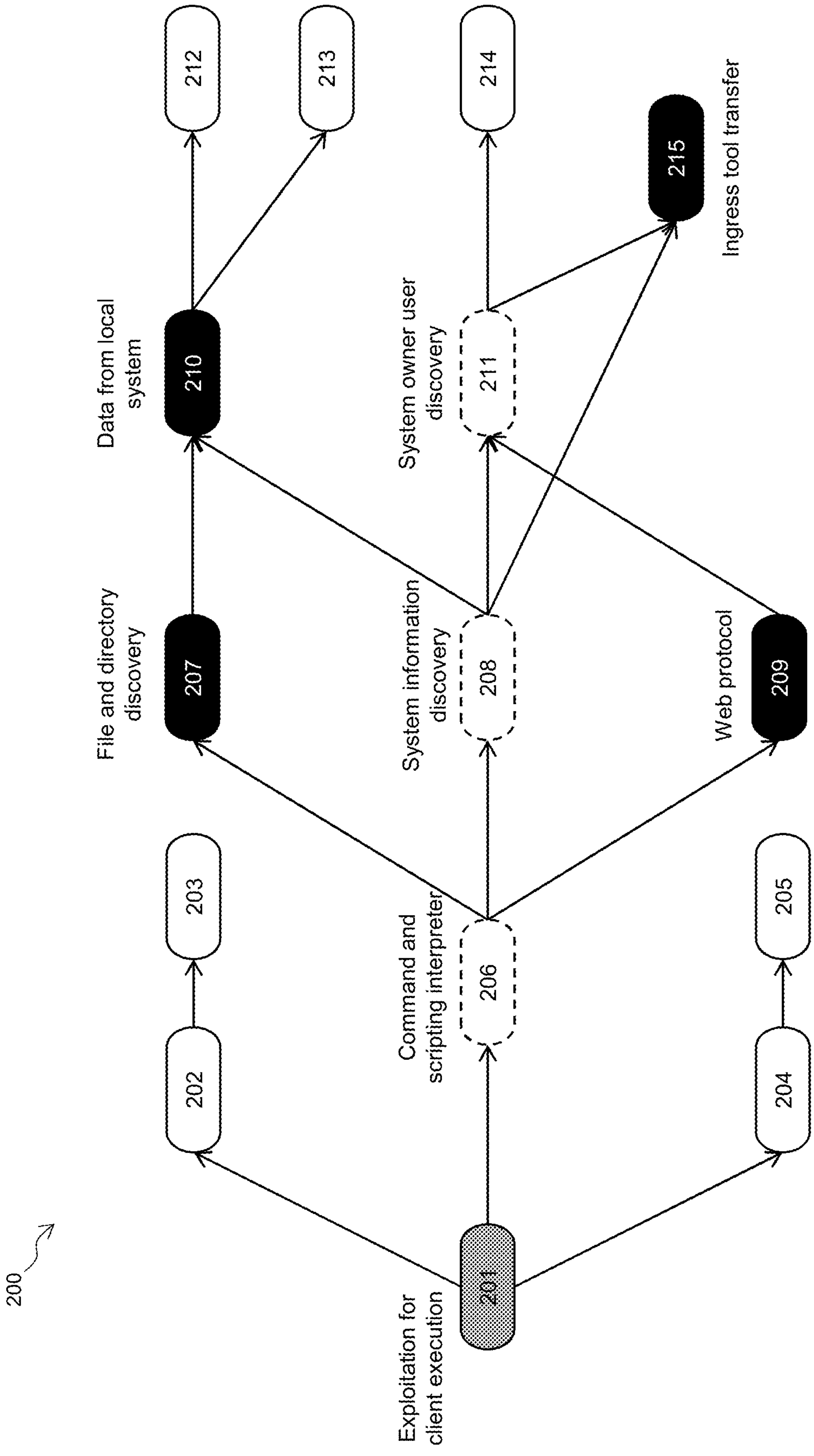

FIG. 2D shows another possible subsequent stage of the attack campaign. In FIG. 2C, the detected evidence is the command scripting interpreter 206, the system information discovery stage 208, and the system owner user discovery stage 211. Based on detecting these three pieces of evidence (i.e., determining that these stages occurred with a baseline probability), the other stages thus may occur with various probabilities, which may be different than their respective probabilities in FIGS. 2A and 2B. Given the detection of the command scripting interpreter 206, the system information discovery stage 208, and the system owner user discovery stage 211, there is a high probability that the next stage will include a file and directory discovery stage at 207 (P=0.7), data from the local system at stage 210 (P=0.73), a web protocol stage at 209 (P=0.78), or an ingress tool transfer (P=0.69). There is still a medium probability that, given the detection of a command and scripting interpreter at 206, a previous stage in the attack was an exploitation for client execution at 201.

FIG. 3 is an example process 300 for generating a predictive response that can be performed within the system of FIG. 1, according to some embodiments of the present disclosure. Process 300 can be performed by server 106 and its various modules. At block 305, the attack detection module 108 receives detected attack information associated with an entity, which can be associated with the endpoint 102. The attack detection module 108 receives a list of the detected techniques, sub-techniques, tactics, and software class from the attack. In some embodiments, the attack detection module 108 can also receive attack information from one or more of the third party detection services 122. In other words, the attack (i.e., evidence of an attack) can have been actively detected by a component within server 106 (such as the attack detection module 108) or information can be received from a third-party service 122 indicating they have identified evidence of an attack.

At block 310, the parameter configuration module 110 configures the model input parameters based on the attack information received at block 305. In essence, the parameter configuration module 110 configures information such that it can be received as an input by the BBN model 112, such as by indicating that the detected attack information is evidence, thereby demarcating an associated node in the BBN model 112 as evidence. In some embodiments, configuring the model input parameters can include configuring a multi-evidence input. For example, a parameter can indicate the number of evidence nodes, the time dispersion of evidences, the distance of the evidence, the type of evidences (e.g., security alert evidence, benign activity evidence), and how evidences are linked. Inputting information such as this can improve the accuracy of the BBN model 112. In some embodiments, the parameter configuration module 110 can query the BBN model 112 to search for the node with an exact match to the evidence. In some embodiments, in the case that no exact match is found, then an output of "no match" should be issued. In some embodiments, an approximate match can be made if no exact match is found. For example, an approximate match can be mased based on a node's partial definition, such as only one or more (but not all) of the tactic, technique, sub-technique, and software class. Matches can also be made where the Hamming distance or Earth movers distance is calculated and determined to be within a predefined range. Other matching techniques are possible, as well.

At block 315, server 106 uses the BBN model 112 and the graph analysis module 114 to determine prediction results and influence analysis results based on the evidence defined at block 310. There are two outputs at block 315. First, the output form the BBN model 112 includes a list of child nodes associated and their respective probabilities of occurring given the detected evidence. The list can include various information associated with each child: (1) probability—true and false probability values; and (2) a description of the child's name including at least one of the node's parameters (technique, sub-technique, tactic, software, role, and action codes—an ordered list of response action types associated with the child node and the evidence parent node). An action code represents a cybersecurity response operation meant to prevent the predicted attack state (i.e., the predicted child node). Potential actions can include, but are not limited to, network traffic blocking, host complete isolation, email sender blocking, deletion of email from mailbox, a kill process, deletion of files, deactivation of user accounts, and others.

Block 315 also includes an output from the graph analysis module 114. This output can include one or more predictions, including (1) a prediction of next/future steps that may occur in the attack; (2) a prediction of previous/past steps that may have already occurred; (3) a prediction of nodes in between two evidence nodes on the same path; and (4) correlation between evidence nodes. For example, various pieces of evidence may be supplied by different applications. It can be useful to check the accuracy of one evidence as predicted by others. This can be done by predicting one evidence based on the other and comparing the predicted probability to the actual event. The output from the graph analysis module 114 can also include the distance between each input evidence and its predicted child nodes (child nodes that are already evidence can be excluded). Predicted nodes that are in the path between two evidence nodes can be tagged as "gaps" or hidden child nodes (e.g., with a prediction type flag). In some embodiments, the graph analysis module 114 can restrict the output to a subset of predicted nodes based on prior assumptions. For example, the size of the output can be minimized to child nodes that are of interest based on, for example, their tag type and distance from the evidence node. In some embodiments, only predicted nodes with a distance of three of fewer from each evidence can be included. In some embodiments, gap node predictions can be excluded. In some embodiments, only nodes with a probability that exceeds a predefined threshold can be included. In some embodiments, only nodes with a probability that increased by a certain percentage can be included.

Examples of prediction flag types for nodes are shown below in Table 1. In some embodiments, there can be seven different possible flags that each indicate various scenarios. Flag 1 indicates that the node is a non-gap prediction and that it was tested on all child node generations. Flag 2 indicates that the node is a non-gap prediction and that it was tested on all child node generations within a predefined distance threshold. Flag 3 indicates that the node is a non-gap prediction but a mix case, where the node was tested on one path until the distance threshold was reached and all node generations on another path. Flag 4 indicates that the node is a gap prediction and that it should be filtered out for response prediction purposes only (see block 320). An example of a node with Flag 4 is shown in FIG. 7A. Flag 5 indicates that the node is a non-gap prediction but a mix case, where the node is a junction node with split paths (some with gaps and some without). Flag 6 indicates that the node is a non-gap prediction but a mix case, where the node is a junction with split paths (some with gaps and some without) that was tested on child nodes within a predefined distance threshold. An example of a node with either Flag 5 or 6 is shown in FIG. 7B. Flag 7 indicates that the node is a non-gap prediction that was tested on at least one path with gaps, at least one path that was fully checked, and one without, but all tests were tested within the distance threshold.

TABLE 1

| Flag | Description | Filter usage |
|---|---|---|
| 1 | Non gap indication, tested on all child nodes generations | None |
| 2 | Non gap indication, tested on child nodes generations till distance threshold | None |
| 3 | Non gap. A mix case: tested on one path till distance threshold and another one on all node generations | None |
| 4 | Gap | Filter out for response prediction purposes only |
| 5 | Non gap mix case, a junction node with split paths case, some with gaps and some without | None |
| 6 | Non gap mix case, a junction node with split paths case, some with gaps and some without-tested on child nodes till the distance threshold | None |
| 7 | Non gap case: tested at least one path with gap(s) at least one that checked completely and at least one that checked till the distance threshold | None |

Finally, the output from the graph analysis module 114 can include a set of action types that should be executed for each predicted child node. The graph analysis module 114 can automatically select the set of actions according to the parent node that is defined as the direct root-cause of the prediction.

At block 320, the filtering module 116 filters the output from the graph analysis module 114. For example, the filtering module 116 can utilize one or more of probability, distance, and count thresholds to filter out nodes. In some embodiments, the filtering module 116 can utilize configurable (advanced configuration) parameters, including prediction type (future, historical, or gap), a maximum number of child nodes, a probability difference threshold, a child probability threshold, and a maximum distance of child nodes. Therefore, the filtering module 116 filters out/excludes child nodes that don't meet these threshold and conditions. In some embodiments, the probability difference threshold can measure the positive change of the probability of each predicted node. In some embodiments, the output of the filtering module 116 can be limited to the pre-defined configuration parameters. Various exemplary configuration parameters are shown below in Table 2.

TABLE 2

| # | Parameter name | Default Value | Range | Configuration type |
|---|---|---|---|---|
| 1 | Child prediction probability threshold | 0.6 | 0.1-1 | Advanced BN settings |
| 2 | Max predicted child nodes | 3 | 1-5 | Advanced BN settings |
| 3 | Max predicted distance | 3 | 1-4 | Advanced BN settings |
| 4 | Predict type | Predict | Gap, Predict or both | Advanced BN settings |
| 5 | Probability diff threshold | 1.05 (i.e., at least 5% change) | 1-2 | Advanced BN settings |

At block 325, the de-duplication module 118 verifies de-duplication of the results (i.e., the filtered results obtained at block 320). In some embodiments, the de-duplication process verifies that the proposed combination of response actions and indicators were not already suggested for preventing attack steps that are based on evidence (i.e., based on attack steps that were already detected) or in other prediction response action suggestions. In some embodiments, the de-duplication process may not require an exact match but may be based on a threshold of similarity.

At block 330, the action determination module 120 sets the predictions (i.e., determines a finalized set of child nodes) and their associated actions. In some embodiments, these actions can be set to be unique. Additional details on the processes for selecting actions are described with respect to FIGS. 8, 13, and 14.

Figure 4:
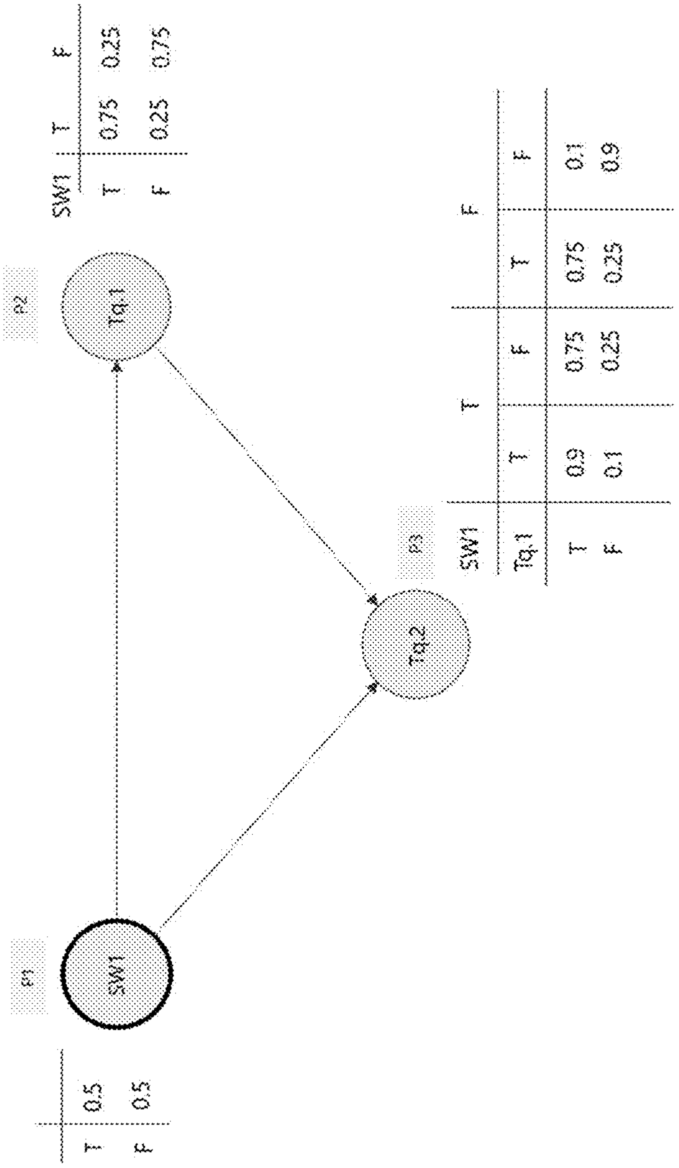
FIG. 4 shows an example influence diagram.

FIG. 4 shows an example influence diagram. Node SW1 represents observed/detected evidence, which means that the system (e.g., the attack detection module 108) observed a piece of software that was classified as SW1 (e.g., a keylogger). The probability of evidence is fixed and is typically based on the system's triggered security lead that provided the evidence. For example, the probability can be assigned a value of 1. Given SW1 is true, the probability that Tq.1 is the next attack state is given by the P2 table: a probability of 0.75 that Tq.1 will occur and 0.25 that it won't. Given that both SW1 and Tq.1 are true, the probability that Tq.2 will occur is given by the P3 table: a probability of 0.9 that Tq.2 will occur and 0.1 it won't. It is important to note that the influence diagram of FIG. 4 is a simplistic representation of a full diagram, which would include more decision parameters for each node.

Such an influence diagram allows for obtaining answers/predictions to various questions. For example, the diagram can be used to determine the probability of a child node occurring given a parent node has occurred or been detected. To make such a prediction, a post intervention joint distribution can be used: Pr(Tq.2|SW1=T). This function will provide the probability that Tq.2 will occur given that SW1 was observed as evidence.

Another example is a root-cause investigation question. In other words, the influence diagram allows for the prediction of the probability of a cause given an effect. To make such a prediction, an inverse probability function is used: Pr(Tq.2|SW1). This provides the probability that SW1 occurred before the observation of Tq.2. Another example is Pr(Tq.2|Tq.1, SW1), which provides the probability that both SW1 and Tq.1 occurred before the observation of Tq.2.

In some embodiments, investigation and correlation can also be obtained using the influence diagram. Other types of predictions can also be a prediction of attack pathways that includes intermediate nodes and an analysis of the identity of an attacker based on their attack pathway. This can be done either in conjunction with the use of their tools or independently of the tools and merely based on the pathway. In some embodiments, predictions can depend on the last k nodes of an attacker. This can be implemented using a hypergraph in which each parent node includes multiple nodes/observations. It is also possible that the number k can depend on which action is being looked at. For example, the length of history can be determined using machine learning to ensure that a sufficient fit of the prediction of the next node is obtained.

Figure 5:
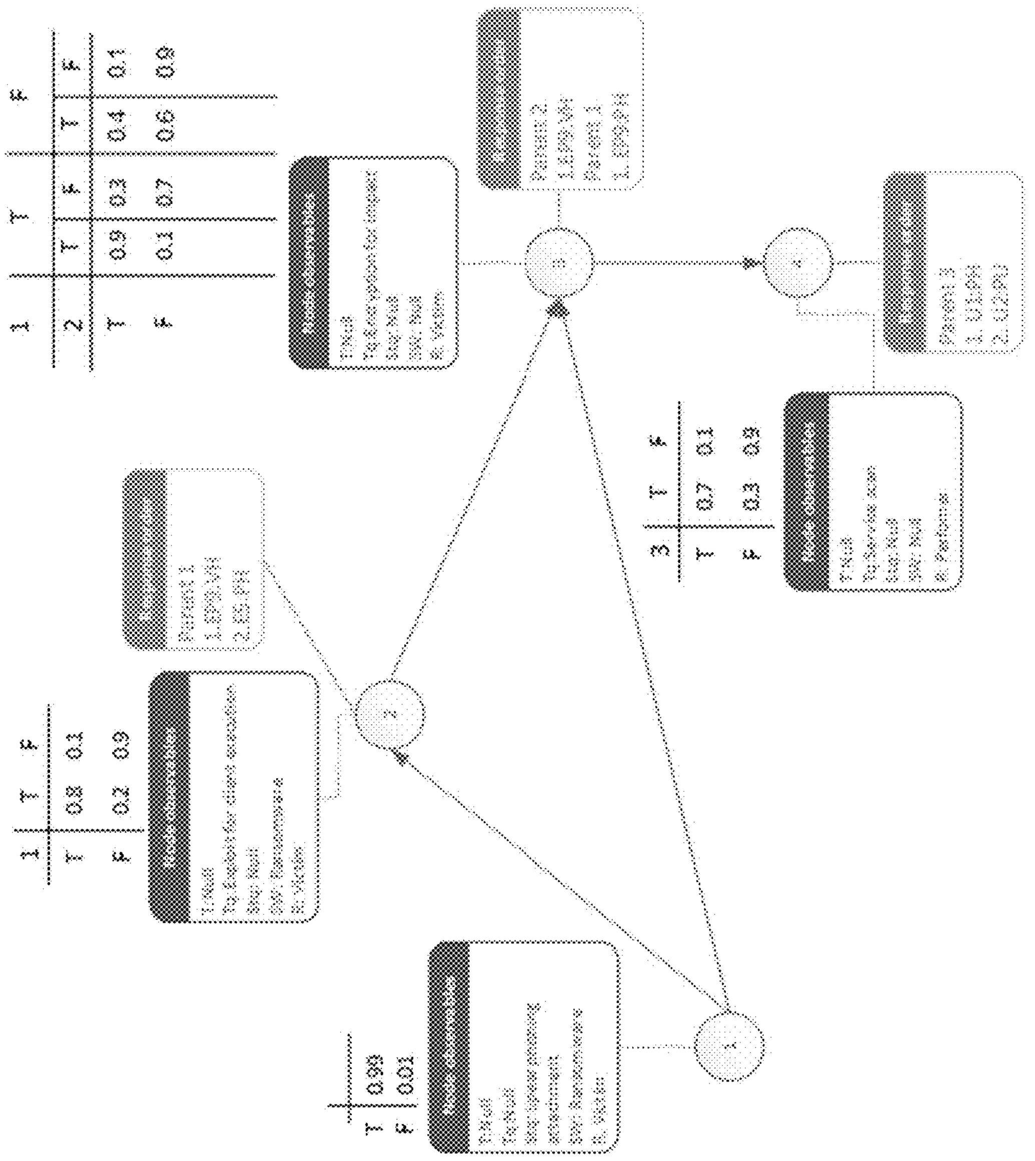
FIG. 5 shows an example influence diagram for generating a predictive response, according to some embodiments of the present disclosure.

FIG. 5 shows an example influence diagram for generating a predictive response, according to some embodiments of the present disclosure. The diagram includes nodes 1-4, and each node includes associated observables (i.e., parameters, identifying information, etc.) and a probability table. The parameters include the tactic ("T"), the technique ("Tq"), the sub-technique ("stq"), the software ("SW"), and the role in the attack ("R"). For example, node l's tactic and technique are null, the sub-technique is a spear phishing attachment, the software is ransomware, and the role is a victim. Node 2's tactic is null, the technique is an exploit for client execution, the sub-technique is null, the software is ransomware, and the role is a victim. Node 3's tactic is null, the technique is encryption for impact, the sub-technique and software are null, and the role is a victim. Node 4's tactic is null, the technique is a service scan, the sub-technique and the software are null, and the role is a performer. In addition, nodes 2-4 include a list of response actions.

Figure 6:
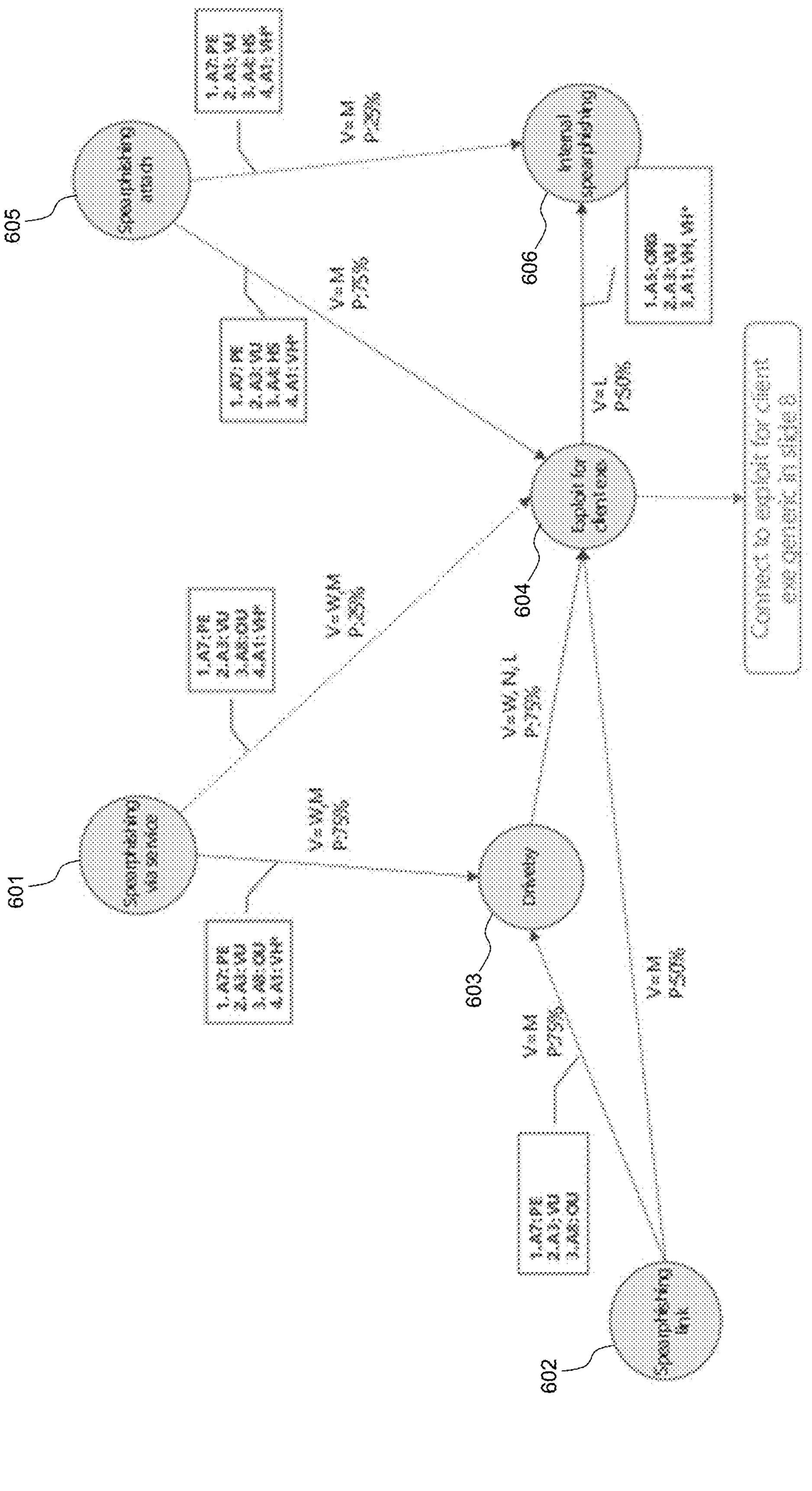
FIG. 6 shows an example influence diagram for phishing, according to some embodiments of the present disclosure.

FIG. 6 shows an example influence diagram for phishing, according to some embodiments of the present disclosure. The influence diagram illustrates potential applicable pathways for a phishing attack. The stages include spear phishing via a service at stage 601, a spear phishing link at stage 602, a drive-by at stage 603, an exploit for client executions at stage 604, a spear phishing attachment at stage 605, and internal spear phishing at stage 606. The connection between each node indicates where the parent threat vector ("V") originated from. For example, V=M at the connection between stages 602 and 603 indicates that the original threat vector was an email. In another example, V=W, N, L between stages 603 and 604 indicates that the original threat vector was an email, over a network, and from the web. Additionally, each connection indicates a probability level (e.g., P=50% between stages 602 and 604) and various response actions, such as, but not limited to, network traffic blocking, host complete isolation, email sender blocking, deletion of email from mailbox, a kill process, deletion of files, deactivation of user accounts, and others. The response actions are organized in a table (herein referred to as a "response table"). In some embodiments, the format XX:YY can be used to indicate an applicable response action and an indicator for triggering or identifying such an action. Various codes, such as two-digit codes, can be used to identify both the actions and the indicators. For example:

A1=isolate a host;
A2=reset password;
A3=disable user account;
A4=block hash;
A5=send email;
A6=search emails;
A7=block sender;
A8=block URL;
A9=delete emails.

For the indicators, the following can be used:

VH=victim host (domain name or URL);
PH=performer host (domain name or URL);
VU=victim user;
PU=performer user;
VE=victim email;
PE=performer email;
OU=original URL;
MI=email message ID;
HS=hash;
FN=file or process name.

It is important to note that these are merely exemplary in nature and are not limiting. Looking at an exemplary code in FIG. 6, the response table at the connection between stages 602 and 603 includes (1) A7:PE—block the sender of the performer email; (2) A3:VU—disable the user account of the victim user; and (3) A8:OU—block the URL of the original URL.

Figure 7C:
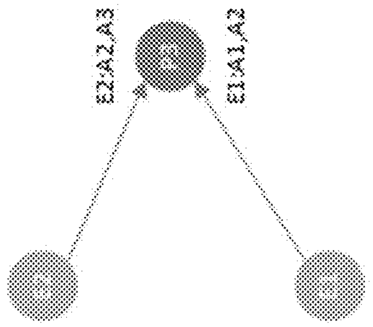
FIGS. 7A-7C show example prediction flag types, according to some embodiments of the present disclosure.
Figure 7A:
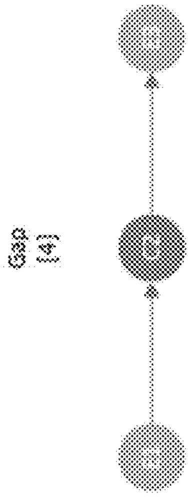
Figure 7B:
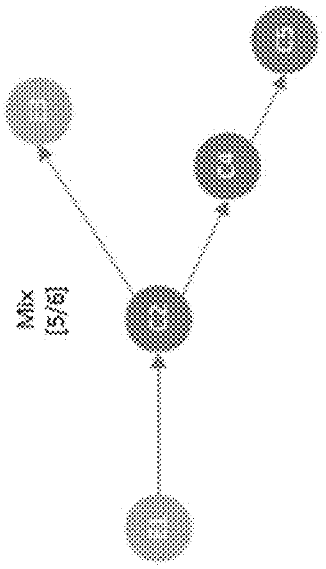

FIGS. 7A-7C show example prediction flag types, according to some embodiments of the present disclosure. In particular, FIGS. 7A and 7B show examples of gap prediction. In the case of FIG. 7A, nodes E1 and E3 have been detected and are therefore evidence. A prediction of node C2 would therefore be a gap prediction because it falls along the pathway connecting the detected evidence. In other words, the predicted node C2 is not a child of every evidence node as, while it is a child node of E1, it is a parent node of E3. In FIG. 7B, nodes E1 and E3 again have been detected are therefore evidence. Predictions of C2, C4, and C5 would therefore be gap predictions because they fall along the pathway between the detected evidence. Nodes C2, C4, and C5 are not children of all detected evidence.

FIG. 7C shows an example prediction of a child that has multiple parent nodes. In particular, nodes E1 and E2 have been detected and are therefore evidence. A prediction of P3 would therefore be a node that has multiple parents. Predictions of child nodes with multiple evidence nodes as parents can include the following procedures. In some embodiments, the parent evidence node with the highest risk score can be chosen and the associated actions for that node are set. In the case that the parent evidence nodes have the same risk, a union of the nodes' actions can be set. In some embodiments, the order of the actions can be set by prioritizing actions from the parent node that is more specific (i.e., specific to the order of node parameters). The order of specificity is as follows: software→sub-technique→technique→tactic. In the case that the nodes have the same level of specificity, the actions can be ordered to some other metric. In some embodiments, the setting of actions based on the risk level can be optional. In some embodiments, the system can obtain the parent evidence with the lowest weight, can obtain the average of weights across parents, or select a random parent. Various methodologies of which parent to choose and how to weigh the relative risks can be utilized.

Figure 8:
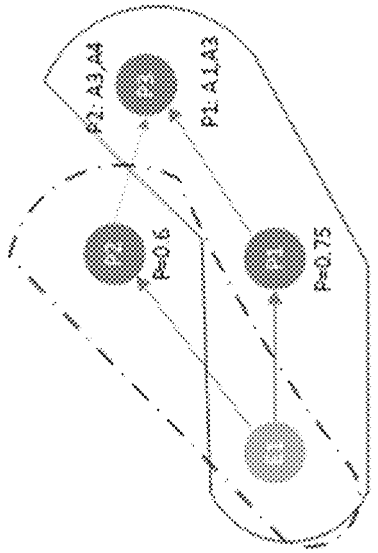
FIG. 8 shows another example prediction flag type, according to some embodiments of the present disclosure.

FIG. 8 shows another example prediction flag type, according to some embodiments of the present disclosure. In particular, FIG. 8 illustrates a scenario in which multiple predicted parent nodes lead to the same predicted child node. Node E1 has been detected and is therefore evidence. Nodes P1 and P2 are predicted nodes given the detection of E1, where P1 will occur with a probability of 0.75 and P2 will occur with a probability of 0.6. P3, the third predicted node, is a child of P1 and P2, both of which are predicted nodes. In some embodiments, the setting of actions for node P3 can be performed by setting the actions based on the predicted parent with the highest probability (i.e., P1). In the case that both predicted parent nodes have the same probability, a union of the nodes' actions can be set. Addition details with respect to the selection of actions is described in relation to FIGS. 13 and 14.

The algorithm makes predictions for many nodes. It can also make contingent predictions for some evidence given other evidence. This can be used to calibrate and estimate probabilities for future runs of the algorithm. This can also be used to bootstrap the algorithm.

Figure 9:
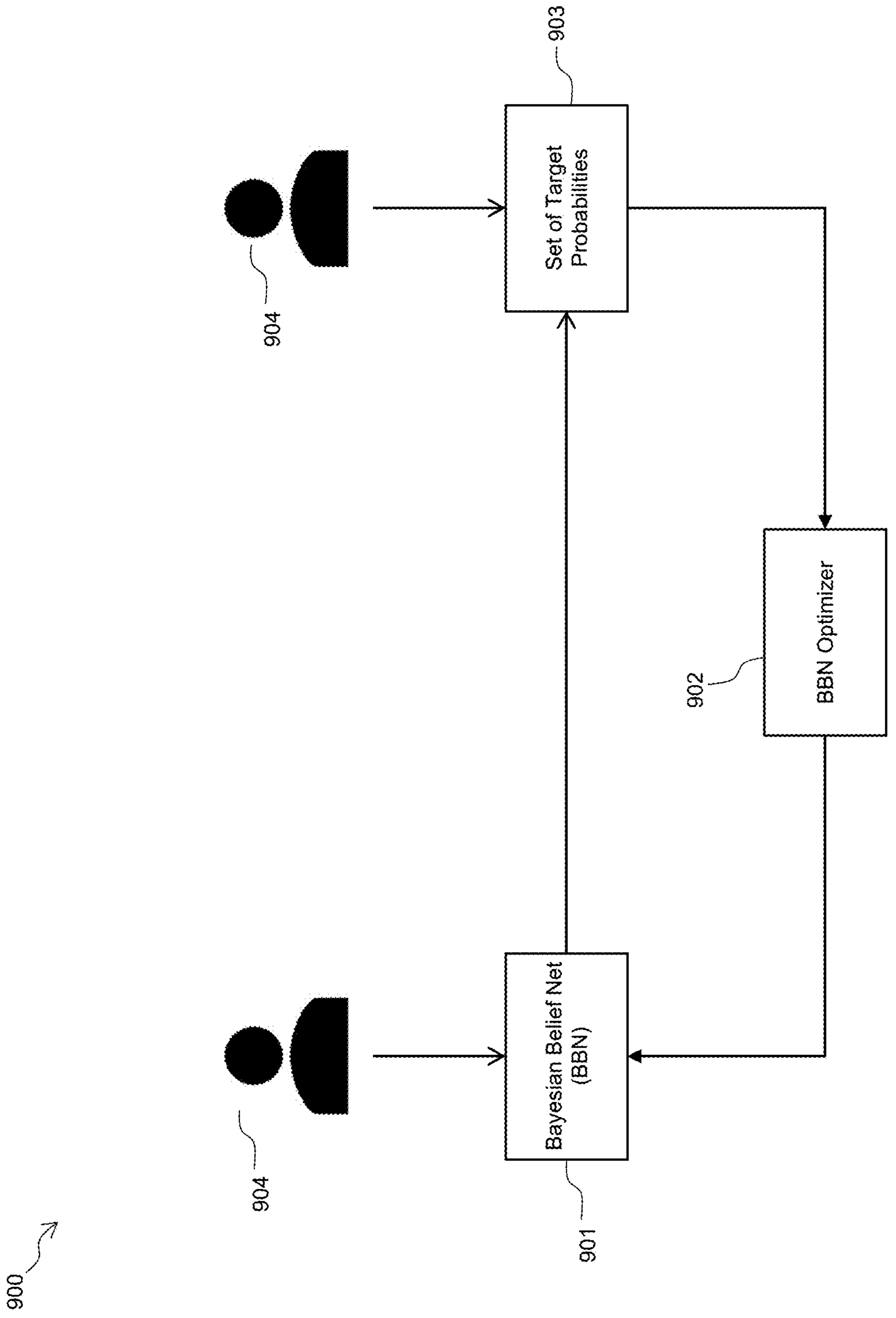
FIG. 9 shows an example optimization flow for a Bayes belief network, according to some embodiments of the present disclosure.

FIG. 9 shows an example optimization flow 900 for a Bayes belief network, according to some embodiments of the present disclosure. The flow 900 describes the high-level supervised optimization process of the transition probabilities within the BBN influence diagram (e.g., BBN model 112). On the left side of flow 900, experts 904 can provide data sets of scenario inputs that includes various sequences of attack steps. In some embodiments, creating the attack sequences can be based on cyber information, such as the MITRE ATT&CK model campaign analysis reports, cybersecurity red-team expertise, samples of real-life attacks from known entities, etc. At 901, the BBN model 112 processes the input data set and creates one or more output files with predictions. The created output can include "smart sampling" of the data, meaning that the created output provides visibility into various areas. The created output provides visibility into influence within the BBN model 112. Nodes that are more influenceable than others within the simulated data set can be determined by using Markov Blanket methods and other similar approaches. For example, key nodes can be identified by various graph analysis techniques. In addition, visibility into which nodes that have a probability close to their defined probability thresholds can be obtained.

At 903, feedback and a set of target probabilities can be defined by experts 904. The experts 904 mark predictions that are true or false. In the case of predictions marked false, the expert can provide feedback on whether the output probability value is above or below the threshold. In some embodiments, other types of labeling can also be used, including the assignment of general probabilities to the nodes. At 905, a BBN optimizer processes the expert feedback file and creates corrections to the original influence diagram. The BBN optimizer can use various tools, such as a k-nearest neighbors algorithm and/or decision tree algorithms to optimize the probabilities. The BBN optimizer can also provide correction that results in a new "candidate" influence diagram. In some embodiments, the optimization flow 900 can end either manually by the experts 904 or by an automatic process that measures the difference between the predicted target and actual probabilities.

Figure 10:
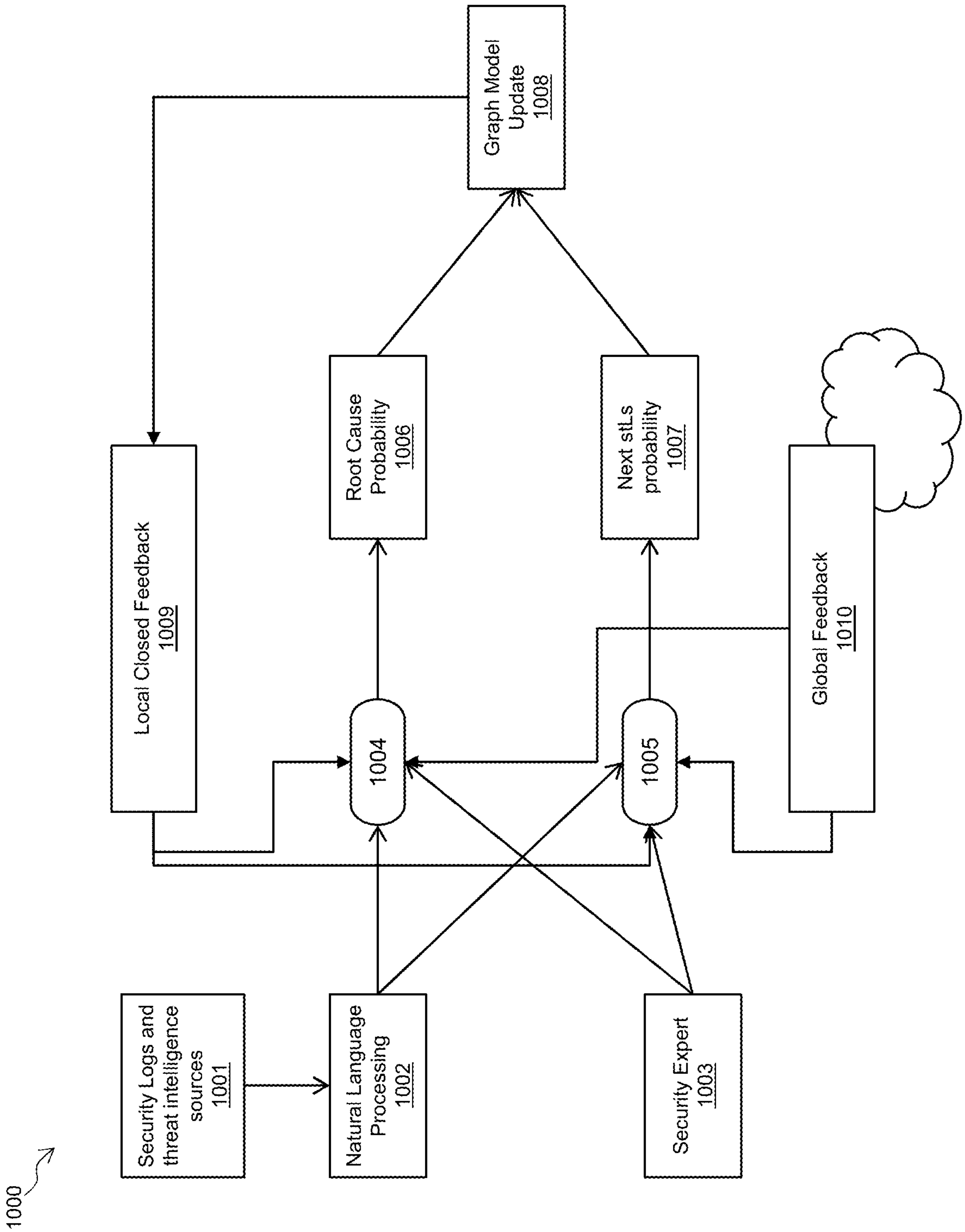
FIG. 10 shows an example closed feedback model for updating the various models described herein, according to some embodiments of the present disclosure.

FIG. 10 shows an example closed feedback model 1000 for updating the various models described herein, according to some embodiments of the present disclosure. In some embodiments, the closed feedback model 1000 may be implemented at a pre-defined frequency, such as every 24 hours. At block 1001, various security logs and information from threat intelligence sources is obtained. This compiled information is input to a natural language processing block 1002 to determine what the input means. For example, a natural language processing program can receive strings of text from various input programs and parses them to determine a meaning. The outputs from the natural language processing block 1002 is then passed to blocks 1004 and 1005, where security experts 1003 provide initial feedback and defining of various parameters (e.g., setting probabilities). At blocks 1004 and 1005, feedback on parsing is generated and a manual assignment of probability is performed. In some embodiments, the probability assignment can also be performed automatically. At block 1006, the BBN model determines root cause probabilities based on the information input by the security experts 1003 and the NLP processed threat intelligence information. At block 1007, the BBN model determines the next stLs probability (i.e., transition probabilities). The outputs from both the root cause probability block 1006 and the next stLs probability block 1007 are used at block 1008 to update the graph analysis model (e.g., graph analysis module 114).

Block 1009 includes a local closed feedback adaptive probability model. In some embodiments, the local closed feedback model can maintain a counter for each node to track hits on that respective node. In addition, the local closed feedback model can maintain a path counter, which counts each path that is hit or predicted. A path can be defined as continuous hits between connected nodes within a pre-defined timeframe (e.g., 4 hours, 24 hours, etc.). The timeframe can also be user configurable. The number of possible paths is defined by the prediction model graph. The path counter timeframe can be agnostic to the attack lifecycle time, meaning it can continue after an attack is closed. In some embodiments, the path counter is maintained per order: (1) a first order counter for the first layer nodes path; (2) a second order counter for the second layer nodes path; and (3) a third order counter for the third layer nodes path. The output from the local closed feedback model at 1009 includes identifying idle paths (i.e., paths that never happened), active paths (the path was rLeated more than a threshold number of times), quite paths (the path was rLeated below a second threshold number of times), path probability (the distribution of path probability according to path counters), and hits to non-connected nodes.

Furthermore, block 1010 includes a global closed feedback adaptive probability model. In some embodiments, the global feedback is based on each individual local closed feedback model. A classification center collects local statistics at a pre-define frequency. These local statistics are then averaged to create a global supportive probability model, which is then used to update/tune the BBN model 112.

In some embodiments, the feedback model 1000 can also utilize techniques such as a fuzzy logic expert system, where two fuzzy logic inference systems are responsible for the probabilities. As uncertainty around observable parameters can be high, the fuzzy logic can therefore be used to counteract this. The fuzzy logic inference systems can use a Mamdani algorithm, and its inputs can include local feedback, the NLP classification (block 1002), and inference rules. Additional details with respect to implementing fuzzy logic are discussed in relation to FIGS. 14-17.

Figure 11:
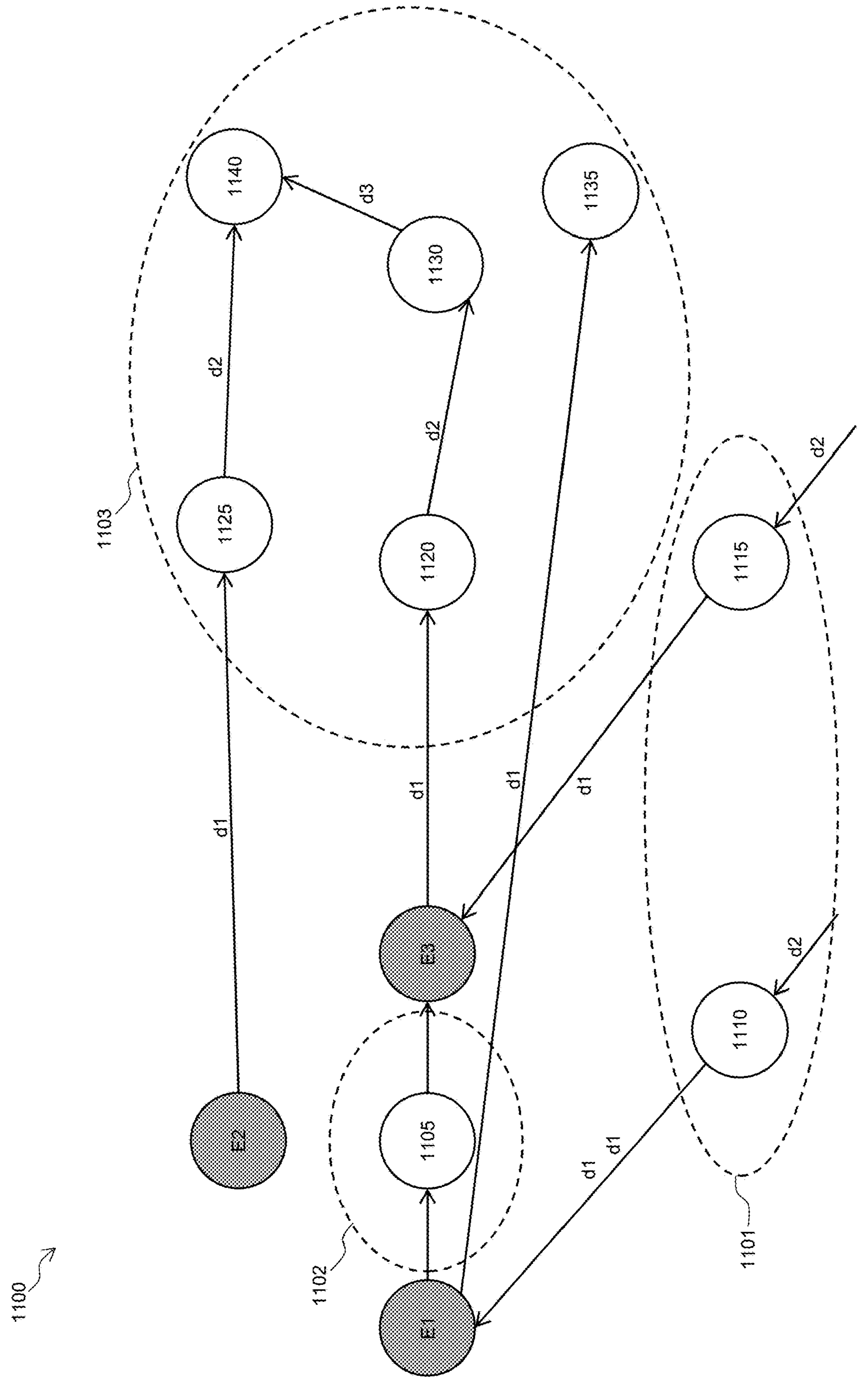
FIG. 11 shows an example prediction scope, according to some embodiments of the present disclosure.

FIG. 11 shows an example prediction scope 1100, according to some embodiments of the present disclosure. The prediction scope 1100 is a scope on a "per entity" basis. In the scope 1100, nodes E1, E2, and E3 comprise the existing attack evidence (i.e., they have been detected by various attack detection techniques). The results based on the detected evidence nodes can include, as described previously, three types of predictions: future predictions, past predictions, and gap predictions. The past predictions 1101 include nodes 1110 and 1115. This means that, given evidence E1-E3, the system predicts respective probabilities that nodes 1110 and 1115 already occurred. Nodes 1110 and 1115 each have a distance d1 from evidence nodes E1 and E3, respectively, meaning they are parents of those evidence nodes. Because they are parents of those evidence nodes, they are predictions of the past.

The gap prediction 1102 includes node 1105. This means that, given evidence E1-E3, the system predicts a probability that node 1105 will occur or has already occurred. Because node 1105 falls along the pathway connecting the detected evidence, it is a gap prediction. In other words, the predicted node 1105 is not a child of every evidence node as, while it is a child node of E1, it is a parent node of E3. The future predictions 1103 include nodes 1120-1140. This means that, given evidence E1-E3, the system predicts respective probabilities that nodes 1120-1140 will occur at some time in the future. Nodes 1120, 1125, and 1135 each have a distance d1 from the evidence nodes E1-E3, meaning they are children of those evidence nodes. Because they are parents of those evidence nodes, they are predictions of the future. In addition, nodes 1130 and 1140 are part of the next layer of nodes, as they are children of predicted nodes 1120 and 1125. This means that they have a distance d2 from the evidence nodes E1-E3. Additionally, because node 1140 is also a child of node 1130, it has a distance d3 from node 1130.

Figure 12:
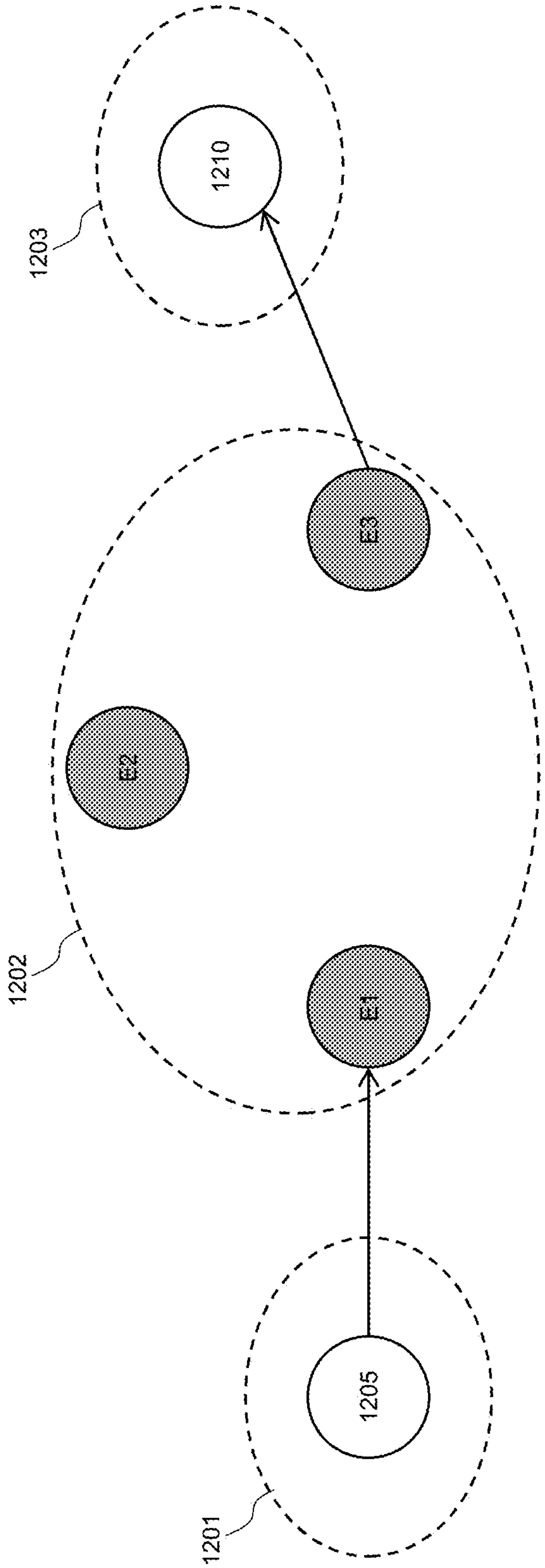
FIG. 12 illustrates probability time decay, according to some embodiments of the present disclosure.

FIG. 12 illustrates probability time decay, according to some embodiments of the present disclosure. In some embodiments, the graph analysis module 114 may factor in the time between detected pieces of evidence when determining probability values. Thus, in some embodiments, the BBN model 112 can utilize probability time decay techniques. As shown in FIG. 12, detected evidence 1202 includes evidence nodes E1-E3. Past predictions 1201 include node 1205, which is a parent of evidence node E1. Future predictions 1203 include node 1210, which is a child of evidence node E3. The probability decay is based on a time function:

$$P_{i\_a} = f(P_i, TSi_{new}, TS-E1)$$

where $P_i$ is the initial probability of the relevant node, $TSi_{new}$ is the time stamp of the "new" evidence (e.g., either evidence node E2 or E3), and TS−E1 is the time stamp of evidence node E1. A probability decay factor D_F can also be used. The attack prediction scope is set according to the attack's existing evidence inputs and the outputs from the BBN model 112, which is defined as the "initial scope." The approach for updating the probabilities within the prediction scope can then be event driven based on the time between evidence. The actual probability can be calculated based on each new evidence in the predicted scope.

Figure 13:
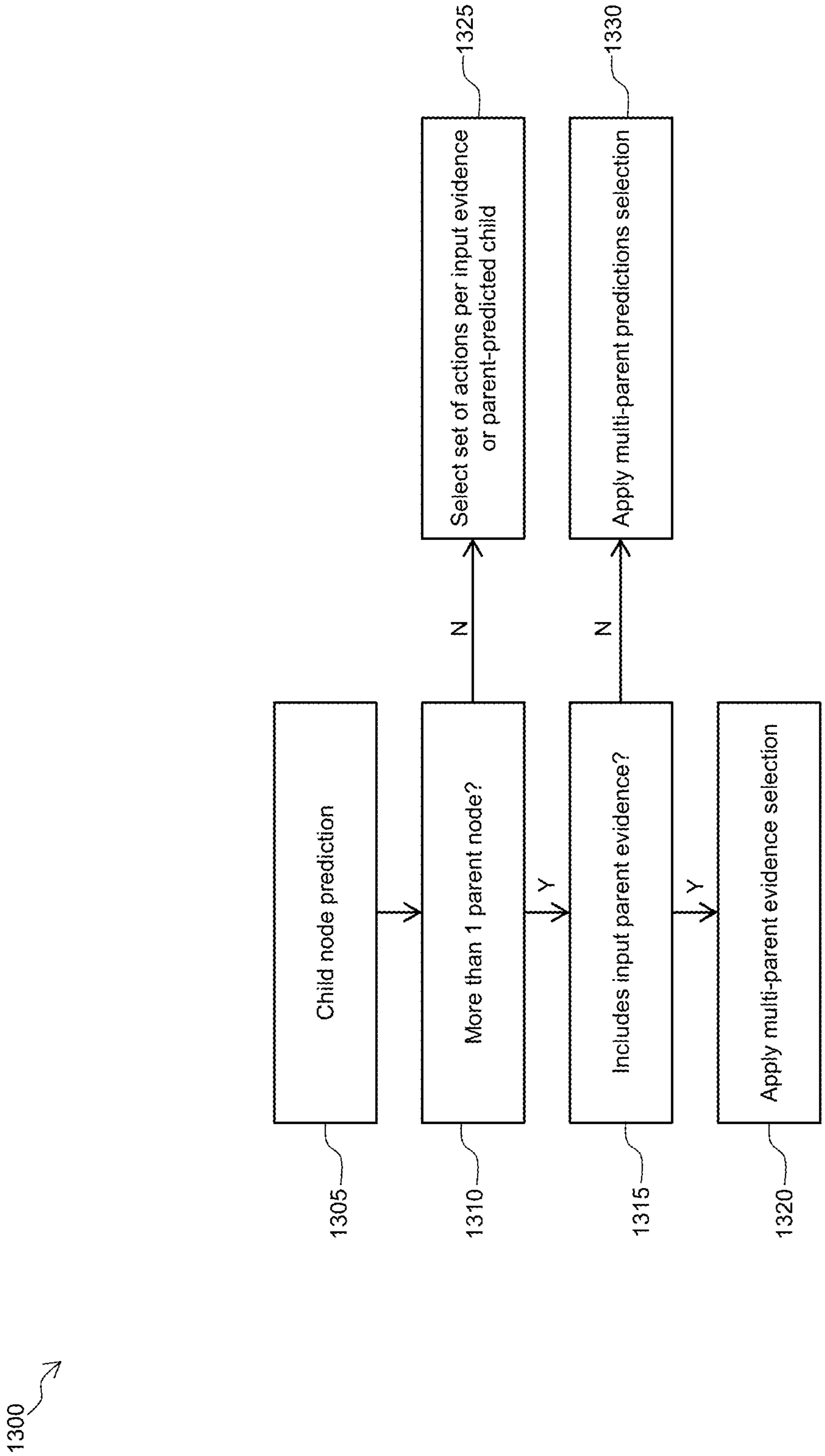
FIG. 13 shows another example process for setting an action, according to some embodiments of the present disclosure.

FIG. 13 shows another example process 1300 for setting an action, according to some embodiments of the present disclosure. In some embodiments, process 1300 can be performed by the action determination module 120 at block 330 of process 300. At block 1305, the action determination module 120 receives a child node prediction from the graph analysis module 114 based on the BBN model 112. At block 1310, the action determination module 120 determines if the child node has more than one parent node (e.g., with a distance of one). If the child node does not have more than one parent node (i.e., it has a single direct parent node), then processing proceeds to block 1325, where the action determination module 120 selects a set of actions based on each detected input evidence or the predicted parent of the child. If the child node does have more than one parent node, then processing proceeds to block 1315. At block 1315, the action determination module 120 determines whether the direct parents to the child include an evidence node. If neither of the direct parents to the child node are evidence nodes, processing proceeds to block 1330. At block 1330, the action determination module 120 applies a multi-parent prediction selection technique (see FIG. 8). If the direct parent nodes of the child node only include evidence nodes, then processing proceeds to block 1320. At block 1320, the action determination module 120 applies multi-parent evidence selection techniques (see FIG. 7C). In the case that a child node has both a predicted node and an evidence node as parents, the action determination module 120 selects actions only from the evidence node.

Figure 14:
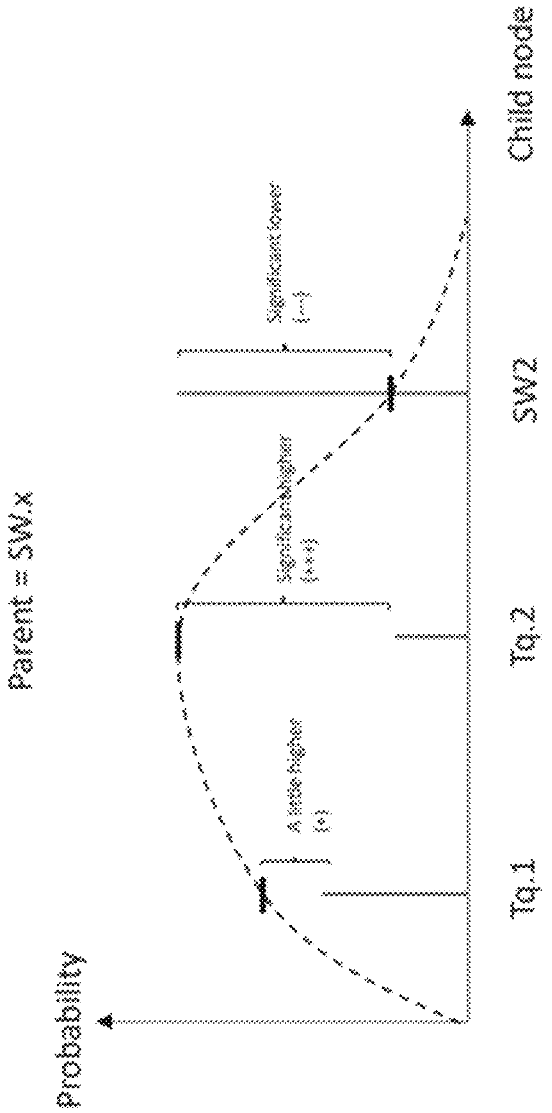
FIG. 14 shows an example probability plot per child node that can be used in a fuzzy logic system, according to some embodiments of the present disclosure.

FIG. 14 shows an example probability plot per child node that can be used in a fuzzy logic system, according to some embodiments of the present disclosure. For example, various probability-based statistics can be used to identify the distance between the last 24 hours probability and the one defined in the model. In some embodiments, each parent-to-child connection can be measured by this stats mechanism. The distance is one of the inputs into the fuzzy logic closed feedback mechanism.

Figure 15:
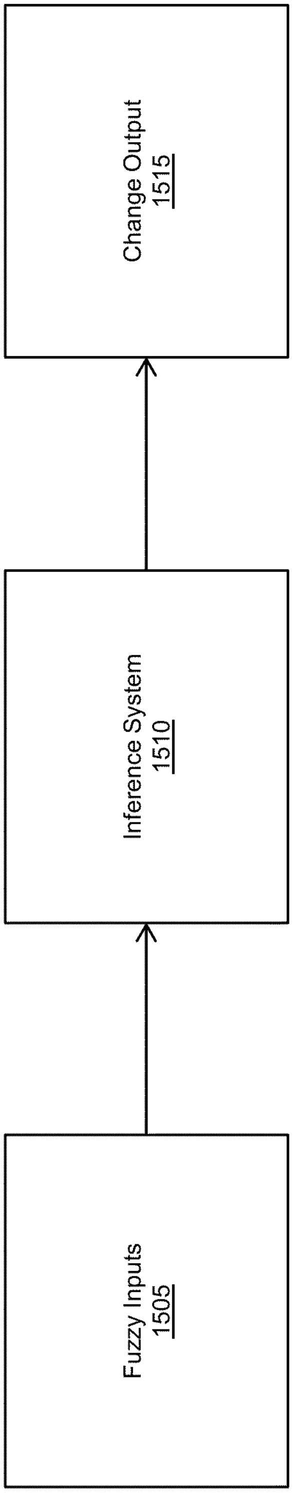
FIG. 15 shows an example closed-feedback via fuzzy logic system, according to some embodiments of the present disclosure.

FIG. 15 shows an example closed-feedback via fuzzy logic system, according to some embodiments of the present disclosure. The system includes various inputs at 1505 to the inference system 1510, which can include local feedback, NLP classification, and various inference rules. The inference system 1510 can be defined by expert rules and aggregation. Then, the output from the inference system 1510 can be changed, such as by defuzzification at block 1515. In some embodiments, the fuzzy logic inputs at 1505 can include relative probability differences (also referred to as a "distance" above), such as significantly lower, lower, slightly lower, none, slightly higher, higher, and significantly higher, although such levels are merely exemplary in nature and more or fewer levels can be utilized. In some embodiments, the inputs can include confidence statistics, such as high, medium, and low. In addition, the fuzzy logic inputs can include NPL results, such as frequency positive NLP classification and/or frequent negative NLP classification.

Figure 16:
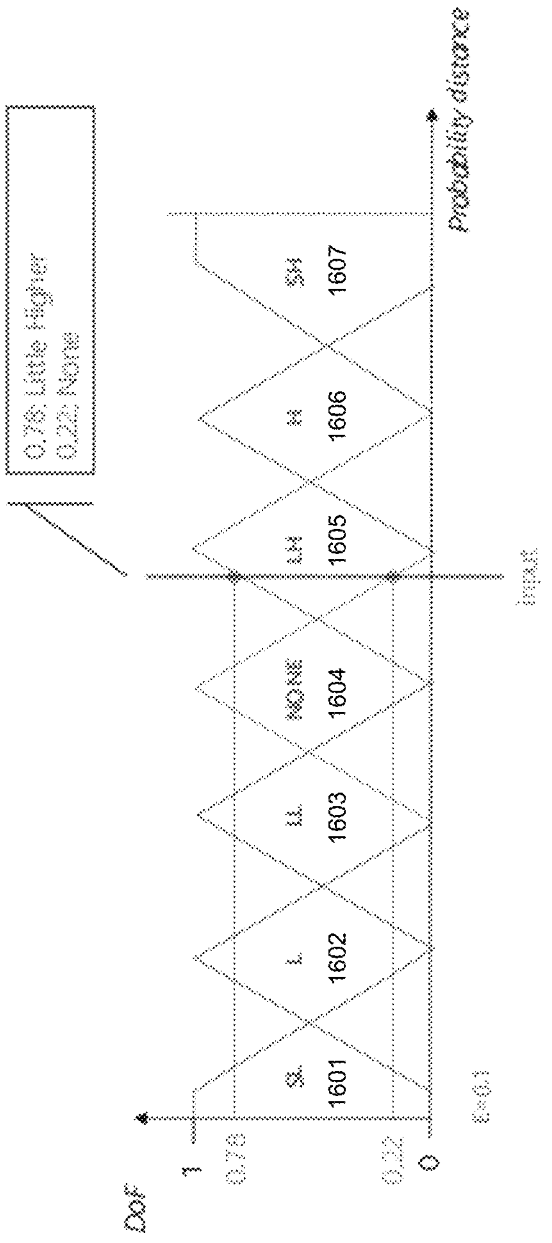
FIG. 16 shows example membership functions, according to some embodiments of the present disclosure.
Figure 17:
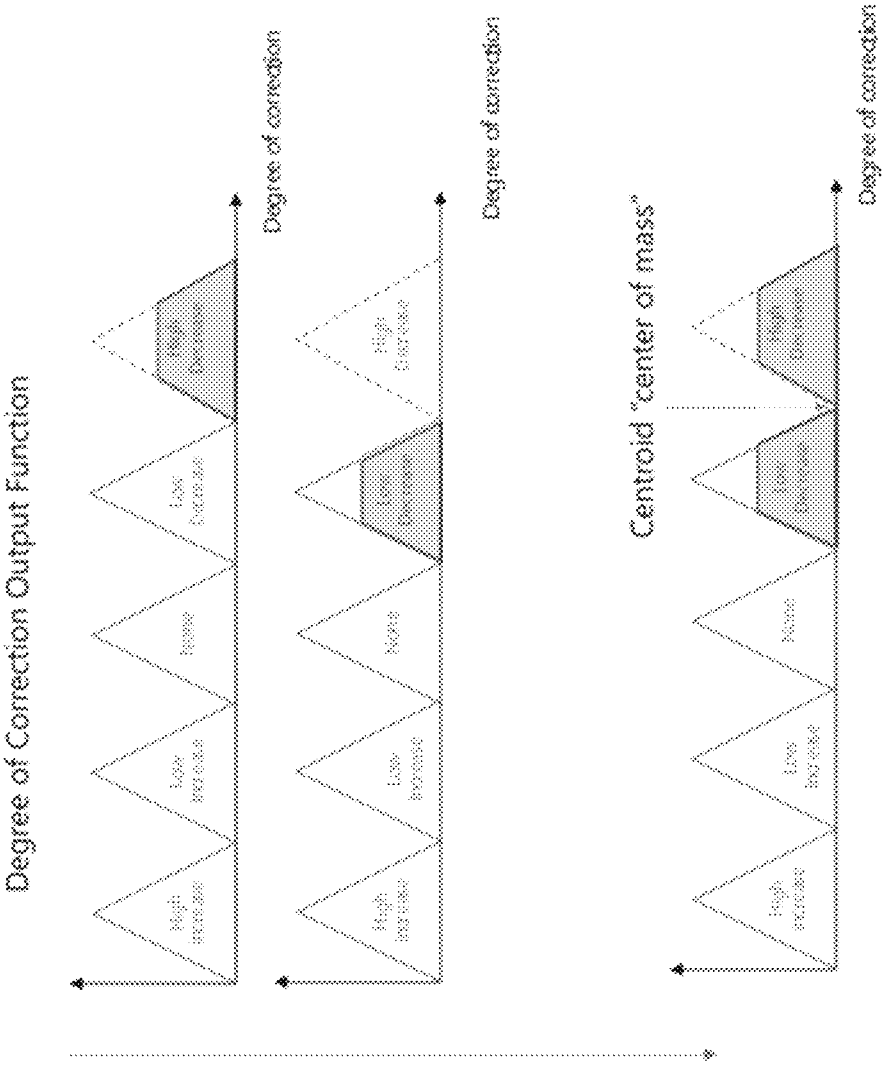
FIG. 17 shows an example centroid function, according to some embodiments of the present disclosure.

FIG. 16 shows example membership functions, according to some embodiments of the present disclosure. In the plot, the y-axis is degrees of fulfillment, while the x-axis is probability distance (i.e., probably difference, as discussed above). In other words, the input to the function is the probability distance, demarcated as the input. The output of the function is therefore N×(DoF), where N is the number of membership functions. In the plot of FIG. 16, there are seven triangular membership functions 1601-1607, which are, from left to right, significantly lower, lower, slightly lower, none, slightly higher, higher, and significantly higher. The 0.78 is a little higher, while the 0.22 is none. Other input functions can be set for confidence levels and NLP evidence. In some embodiments, the output of the membership functions can be used to evaluate a degree of probability change (correction) output function. For example, if the distance is significantly lower (i.e., membership function 1601), then this can signify a high increase in the degree of probability change. If there are two output membership functions, a centroid "center of mass" can be used to arrive a final degree of correction, such as shown in FIG. 17.

Figure 18:
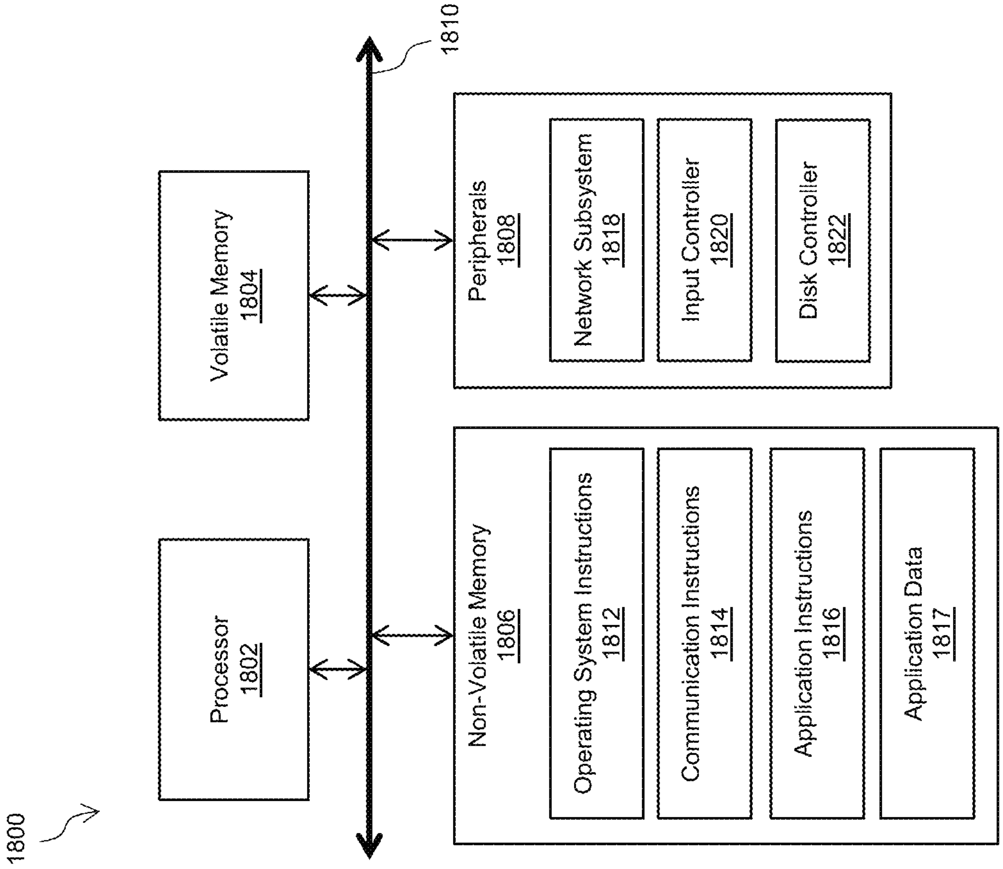
FIG. 18 is an example server device that can be used within the system of FIG. 1 according to an embodiment of the present disclosure.

FIG. 18 is a diagram of an example server device 1800 that can be used within system 100 of FIG. 1. Server device 1800 can implement various features and processes as described herein. Server device 1800 can be implemented on any electronic device that runs software applications derived from compiled instructions, including without limitation personal computers, servers, smart phones, media players, electronic tablets, game consoles, email devices, etc. In some implementations, server device 1800 can include one or more processors 1802, volatile memory 1804, non-volatile memory 1806, and one or more peripherals 1808. These components can be interconnected by one or more computer buses 1810.

Processor(s) 1802 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 1810 can be any known internal or external bus technology, including but not limited to ISA, EISA, PCI, PCI Express, USB, Serial ATA, or FireWire. Volatile memory 1804 can include, for example, SDRAM. Processor 1802 can receive instructions and data from a read-only memory or a random access memory or both. Essential elements of a computer can include a processor for executing instructions and one or more memories for storing instructions and data.

Non-volatile memory 1806 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 1806 can store various computer instructions including operating system instructions 1812, communication instructions 1814, application instructions 1816, and application data 1817. Operating system instructions 1812 can include instructions for implementing an operating system (e.g., Mac OS®, Windows®, or Linux). The operating system can be multi-user, multiprocessing, multitasking, multithreading, real-time, and the like. Communication instructions 1814 can include network communications instructions, for example, software for implementing communication protocols, such as TCP/IP, HTTP, Ethernet, telephony, etc. Application instructions 1816 can include instructions for various applications. Application data 1817 can include data corresponding to the applications.

Peripherals 1808 can be included within server device 1800 or operatively coupled to communicate with server device 1800. Peripherals 1808 can include, for example, network subsystem 1818, input controller 1820, and disk controller 1822. Network subsystem 1818 can include, for example, an Ethernet of WiFi adapter. Input controller 1820 can be any known input device technology, including but not limited to a keyboard (including a virtual keyboard), mouse, track ball, and touch-sensitive pad or display. Disk controller 1822 can include one or more mass storage devices for storing data files; such devices include magnetic disks, such as internal hard disks and removable disks; magneto-optical disks; and optical disks.

Figure 19:
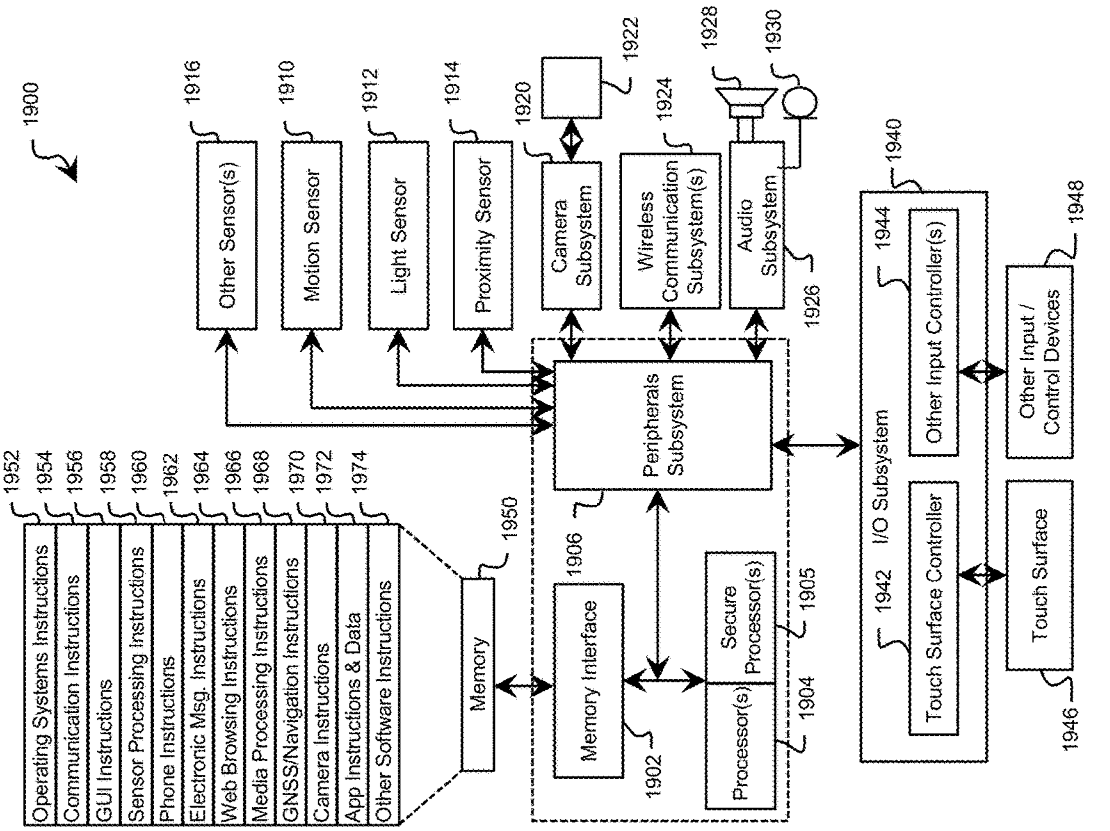
FIG. 19 is an example computing device that can be used within the system of FIG. 1 according to an embodiment of the present disclosure.

FIG. 19 is an example computing device that can be used within the system 100 of FIG. 1, according to an embodiment of the present disclosure. In some embodiments, device 1900 can be endpoint 102. The illustrative user device 1900 can include a memory interface 1902, one or more data processors, image processors, central processing units 1904, and/or secure processing units 1905, and peripherals subsystem 1906. Memory interface 1902, one or more central processing units 1904 and/or secure processing units 1905, and/or peripherals subsystem 1906 can be separate components or can be integrated in one or more integrated circuits. The various components in user device 1900 can be coupled by one or more communication buses or signal lines.

Sensors, devices, and subsystems can be coupled to peripherals subsystem 1906 to facilitate multiple functionalities. For example, motion sensor 1910, light sensor 1912, and proximity sensor 1914 can be coupled to peripherals subsystem 1906 to facilitate orientation, lighting, and proximity functions. Other sensors 1916 can also be connected to peripherals subsystem 1906, such as a global navigation satellite system (GNSS) (e.g., GPS receiver), a temperature sensor, a biometric sensor, magnetometer, or other sensing device, to facilitate related functionalities.

Camera subsystem 1920 and optical sensor 1922, e.g., a charged coupled device (CCD) or a complementary metal-oxide semiconductor (CMOS) optical sensor, can be utilized to facilitate camera functions, such as recording photographs and video clips. Camera subsystem 1920 and optical sensor 1922 can be used to collect images of a user to be used during authentication of a user, e.g., by performing facial recognition analysis.

Communication functions can be facilitated through one or more wired and/or wireless communication subsystems 1924, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 1924. The specific design and implementation of communication subsystems 1924 can depend on the communication network(s) over which the user device 1900 is intended to operate. For example, user device 1900 can include communication subsystems 1924 designed to operate over a GSM network, a GPRS network, an EDGE network, a WiFi or WiMax network, and a Bluetooth™ network. For example, wireless communication subsystems 1924 can include hosting protocols such that device 1900 can be configured as a base station for other wireless devices and/or to provide a WiFi service.

Audio subsystem 1926 can be coupled to speaker 1928 and microphone 1930 to facilitate voice-enabled functions, such as speaker recognition, voice replication, digital recording, and telephony functions. Audio subsystem 1926 can be configured to facilitate processing voice commands, voice-printing, and voice authentication, for example.

I/O subsystem 1940 can include a touch-surface controller 1942 and/or other input controller(s) 1944. Touch-surface controller 1942 can be coupled to a touch-surface 1946. Touch-surface 1946 and touch-surface controller 1942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 1946.

The other input controller(s) 1944 can be coupled to other input/control devices 1948, such as one or more buttons, rocker switches, thumb-wheel, infrared port, USB port, and/or a pointer device such as a stylus. The one or more buttons (not shown) can include an up/down button for volume control of speaker 1928 and/or microphone 1930.

In some implementations, a pressing of the button for a first duration can disengage a lock of touch-surface 1946; and a pressing of the button for a second duration that is longer than the first duration can turn power to user device 1900 on or off. Pressing the button for a third duration can activate a voice control, or voice command, module that enables the user to speak commands into microphone 1930 to cause the device to execute the spoken command. The user can customize a functionality of one or more of the buttons. Touch-surface 1946 can, for example, also be used to implement virtual or soft buttons and/or a keyboard.

In some implementations, user device 1900 can present recorded audio and/or video files, such as MP3, AAC, and MPEG files. In some implementations, user device 1900 can include the functionality of an MP3 player, such as an iPod™. User device 1900 can, therefore, include a 36-pin connector and/or 8-pin connector that is compatible with the iPod. Other input/output and control devices can also be used.

Memory interface 1902 can be coupled to memory 1950. Memory 1950 can include high-speed random access memory and/or non-volatile memory, such as one or more magnetic disk storage devices, one or more optical storage devices, and/or flash memory (e.g., NAND, NOR). Memory 1950 can store an operating system 1952, such as Darwin, RTXC, LINUX, UNIX, OS X, Windows, or an embedded operating system such as VxWorks.

Operating system 1952 can include instructions for handling basic system services and for performing hardware dependent tasks. In some implementations, operating system 1952 can be a kernel (e.g., UNIX kernel). In some implementations, operating system 1952 can include instructions for performing voice authentication.

Memory 1950 can also store communication instructions 1954 to facilitate communicating with one or more additional devices, one or more computers and/or one or more servers. Memory 1950 can include graphical user interface instructions 1956 to facilitate graphic user interface processing; sensor processing instructions 1958 to facilitate sensor-related processing and functions; phone instructions 1960 to facilitate phone-related processes and functions; electronic messaging instructions 1962 to facilitate electronic messaging-related process and functions; web browsing instructions 1964 to facilitate web browsing-related processes and functions; media processing instructions 1966 to facilitate media processing-related functions and processes; GNSS/Navigation instructions 1968 to facilitate GNSS and navigation-related processes and instructions; and/or camera instructions 1970 to facilitate camera-related processes and functions.

Memory 1950 can store application (or "app") instructions and data 1972, such as instructions for the apps described above in the context of FIGS. 2-14 and for modules 108-118. Memory 1950 can also store other software instructions 1974 for various other software applications in place on device 1900.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for generating a predictive response to a cyberattack comprising:

receiving information relating to a cyberattack on an endpoint;

configuring the information as an input to a directed graph model, wherein the directed graph model comprises a plurality of nodes;

providing the input to the directed graph model;

computing, via the directed graph model, a prediction result, the prediction result comprising one or more predicted nodes from the plurality of nodes and one or more associated probabilities;

classifying the one or more predicted nodes; and determining, based on the classifying and the prediction result, one or more actions for responding to the cyberattack, the one or more actions comprising:

identifying one or more parent nodes of the prediction result; and setting the one or more actions based on risk levels of the one or more parent nodes.

2. The method of claim 1 comprising, prior to the determining, filtering the one or more predicted nodes based on one or more of probability, distance from the input, classification, and total number of nodes.

3. The method of claim 2, wherein filtering the one or more predicted nodes based on probability comprises excluding predicted nodes with a probability less than a pre-defined probability threshold.

4. The method of claim 2, wherein filtering the one or more predicted nodes based on distance from the input comprises excluding predicted nodes with a distance equal to or above a pre-defined threshold.

5. The method of claim 2, wherein filtering the one or more predicted nodes based on classification comprises excluding predicted nodes that are gap nodes.

6. The method of claim 1 comprising, prior to the determining, verifying that a list of response actions associated with the one or more predicted nodes is unique.

7. The method of claim 1, wherein the information comprises a tactic, a technique, a sub-technique, and a software class.

8. The method of claim 1, wherein configuring the information as an input to a directed graph model comprises:

identifying a node of the plurality of nodes that matches the information; and demarcating the identified node as evidence.

9. The method of claim 8, wherein identifying the node that matches the information comprises:

calculating a distance; and determining that the distance is within a predefined range.

10. The method of claim 9, wherein the distance is either a Hamming distance or an Earth movers distance.

11. The method of claim 1, wherein the prediction result further comprises a list of response actions.

12. The method of claim 11, wherein the list of response actions comprises at least one of isolating a host, resetting a password, disabling a user account, blocking a hash, searching emails, blocking a sender, blocking a URL, deleting an email, blocking network traffic, or a kill process.

13. The method of claim 1, wherein classifying the one or more predicted nodes comprises determining whether each node is a future prediction, a past prediction, or a gap prediction.

14. The method of claim 1 comprising using the prediction result to re-train or update the directed graph model.

15. The method of claim 1, wherein determining, based on the classifying and the prediction result, one or more actions for responding to the cyberattack comprises:

identifying a parent node that is defined as a cause of the prediction result; and setting the one or more actions based on the parent node.

16. The method of claim 1, wherein configuring the information as an input to a directed graph model comprises defining at least one evidence node.

17. A method for generating a predictive response to a cyberattack comprising:

receiving information relating to a cyberattack on an endpoint from a third-party service;

configuring the information as an input to a directed graph model, wherein the directed graph model comprises a plurality of nodes;

providing the input to the directed graph model;

computing, via the directed graph model, a prediction result, the prediction result comprising one or more predicted nodes from the plurality of nodes and one or more associated probabilities;

classifying the one or more predicted nodes; and determining, based on the classifying and the prediction result, one or more actions for responding to the cyberattack, the one or more actions comprising:

identifying one or more parent nodes of the prediction result; and setting the one or more actions based on a level of specificity of the one or more parent nodes.

18. The method of claim 17 comprising, prior to the determining, filtering the one or more predicted nodes based on one or more of probability, distance from the input, classification, and total number of nodes.

19. The method of claim 18, wherein filtering the one or more predicted nodes based on probability comprises excluding predicted nodes with a probability less than a pre-defined probability threshold.

20. The method of claim 18, wherein filtering the one or more predicted nodes based on distance from the input comprises excluding predicted nodes with a distance equal to or above a pre-defined threshold.

21. The method of claim 18, wherein filtering the one or more predicted nodes based on classification comprises excluding predicted nodes that are gap nodes.

22. The method of claim 17 comprising, prior to the determining, verifying that a list of response actions associated with the one or more predicted nodes is unique.

23. The method of claim 17, wherein the information comprises a tactic, a technique, a sub-technique, and a software class.

24. The method of claim 17, wherein configuring the information as an input to a directed graph model comprises:

identifying a node of the plurality of nodes that matches the information; and
demarcating the identified node as evidence.

25. The method of claim 24, wherein identifying the node that matches the information comprises:
calculating a distance; and
determining that the distance is within a predefined range.

26. The method of claim 25, wherein the distance is either a Hamming distance or an Earth movers distance.

27. The method of claim 17, wherein the prediction result further comprises a list of response actions.

28. The method of claim 27, wherein the list of response actions comprises at least one of isolating a host, resetting a password, disabling a user account, blocking a hash, searching emails, blocking a sender, blocking a URL, deleting an email, blocking network traffic, or a kill process.

29. The method of claim 17, wherein classifying the one or more predicted nodes comprises determining whether each node is a future prediction, a past prediction, or a gap prediction.

30. The method of claim 17, wherein determining, based on the classifying and the prediction result, one or more actions for responding to the cyberattack comprises:
identifying a parent node that is defined as a cause of the prediction result; and
setting the one or more actions based on the parent node.

31. The method of claim 17, wherein configuring the information as an input to a directed graph model comprises defining at least one evidence node.

32. A method for generating a predictive response to a cyberattack comprising:
receiving information relating to a cyberattack on an endpoint from a third-party service;
configuring the information as an input to a directed graph model, wherein the directed graph model comprises a plurality of nodes;
providing the input to the directed graph model;
computing, via the directed graph model, a prediction result, the prediction result comprising one or more predicted nodes from the plurality of nodes and one or more associated probabilities;
classifying the one or more predicted nodes; and
determining, based on the classifying and the prediction result, one or more actions for responding to the cyberattack, the one or more actions comprising:
identifying one or more parent nodes of the prediction result; and
setting the one or more actions based on probabilities of the one or more parent nodes.

33. The method of claim 32 comprising, prior to the determining, filtering the one or more predicted nodes based on one or more of probability, distance from the input, classification, and total number of nodes.

34. The method of claim 33, wherein filtering the one or more predicted nodes based on probability comprises excluding predicted nodes with a probability less than a pre-defined probability threshold.

35. The method of claim 33, wherein filtering the one or more predicted nodes based on distance from the input comprises excluding predicted nodes with a distance equal to or above a pre-defined threshold.

36. The method of claim 33, wherein filtering the one or more predicted nodes based on classification comprises excluding predicted nodes that are gap nodes.

37. The method of claim 32 comprising, prior to the determining, verifying that a list of response actions associated with the one or more predicted nodes is unique.

38. The method of claim 32, wherein the information comprises a tactic, a technique, a sub-technique, and a software class.

39. The method of claim 32, wherein configuring the information as an input to a directed graph model comprises:
identifying a node of the plurality of nodes that matches the information; and
demarcating the identified node as evidence.

40. The method of claim 29, wherein identifying the node that matches the information comprises:
calculating a distance; and
determining that the distance is within a predefined range.

41. The method of claim 40, wherein the distance is either a Hamming distance or an Earth movers distance.

42. The method of claim 32, wherein the prediction result further comprises a list of response actions.

43. The method of claim 42, wherein the list of response actions comprises at least one of isolating a host, resetting a password, disabling a user account, blocking a hash, searching emails, blocking a sender, blocking a URL, deleting an email, blocking network traffic, or a kill process.

44. The method of claim 32, wherein classifying the one or more predicted nodes comprises determining whether each node is a future prediction, a past prediction, or a gap prediction.

45. The method of claim 32, wherein determining, based on the classifying and the prediction result, one or more actions for responding to the cyberattack comprises:
identifying a parent node that is defined as a cause of the prediction result; and
setting the one or more actions based on the parent node.

* * * * *